US008677179B2

(12) United States Patent
Takeuchi

(10) Patent No.: US 8,677,179 B2
(45) Date of Patent: Mar. 18, 2014

(54) INFORMATION PROCESSING APPARATUS FOR PERFORMING ERROR PROCESS WHEN CONTROLLERS IN SYNCHRONIZATION OPERATION DETECT ERROR SIMULTANEOUSLY

(75) Inventor: Tamotsu Takeuchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 153 days.

(21) Appl. No.: 13/225,146

(22) Filed: Sep. 2, 2011

(65) Prior Publication Data
US 2012/0005525 A1  Jan. 5, 2012

Related U.S. Application Data

(63) Continuation of application No. PCT/JP2009/001038, filed on Mar. 9, 2009.

(51) Int. Cl.
G06F 11/00 (2006.01)
(52) U.S. Cl.
USPC .............................................. 714/12
(58) Field of Classification Search
USPC .............................................. 714/12
See application file for complete search history.

(56) References Cited

U.S. PATENT DOCUMENTS

| 4,428,044 | A | * | 1/1984 | Liron | 714/12 |
| 5,384,906 | A | * | 1/1995 | Horst | 713/375 |
| 5,748,873 | A | | 5/1998 | Ohguro et al. | |
| 5,896,523 | A | * | 4/1999 | Bissett et al. | 713/400 |
| 6,038,685 | A | * | 3/2000 | Bissett et al. | 714/12 |
| 7,107,484 | B2 | * | 9/2006 | Yamazaki et al. | 714/12 |
| 7,356,733 | B2 | * | 4/2008 | Michaelis et al. | 714/12 |
| 7,500,139 | B2 | * | 3/2009 | Mizutani | 714/12 |
| 7,549,082 | B2 | * | 6/2009 | Southgate et al. | 714/12 |
| 7,610,509 | B2 | | 10/2009 | Abe | |
| 8,078,920 | B2 | * | 12/2011 | Morosawa et al. | 714/48 |
| 8,234,521 | B2 | * | 7/2012 | Graham et al. | 714/12 |
| 2004/0153857 | A1 | * | 8/2004 | Yamazaki et al. | 714/43 |

FOREIGN PATENT DOCUMENTS

| EP | 1380953 A1 | 1/2004 |
| JP | 6-95902 | 4/1994 |
| JP | 2006-172220 | 6/2006 |
| JP | 2008-46942 | 2/2008 |
| WO | 98/55922 | 12/1998 |
| WO | 2008/120352 A1 | 10/2008 |

OTHER PUBLICATIONS

PCT International Search Report for Application No. PCT/JP2009/001038; mailed Jun. 9, 2009.
Extended European Search Report issued Jun. 4, 2013 in corresponding European Application No. 09841396.6.

* cited by examiner

Primary Examiner — Bryce Bonzo
Assistant Examiner — Elmira Mehrmanesh
(74) Attorney, Agent, or Firm — Staas & Halsey LLP

(57) ABSTRACT

An information processing apparatus includes a degeneration control unit and a re-synchronization processing instructing unit. The degeneration control unit degenerates, of a first controller group including a first controller and a second controller group including a second controller, the second control device group when the first and second controller performing a synchronization operation with each other detect occurrence of errors. The re-synchronization processing instructing unit instructs a controller included in the first controller group to execute re-synchronization processing. When another controller different from the first controller receives the instruction for the execution of the re-synchronization processing, the another controller performs interrupt mask setting. When the first controller receives the instruction for the execution of the re-synchronization processing, the first controller withholds the execution of the re-synchronization processing, starts error processing, and instructs the controller that performs the interrupt mask setting to release the interrupt mask.

12 Claims, 34 Drawing Sheets

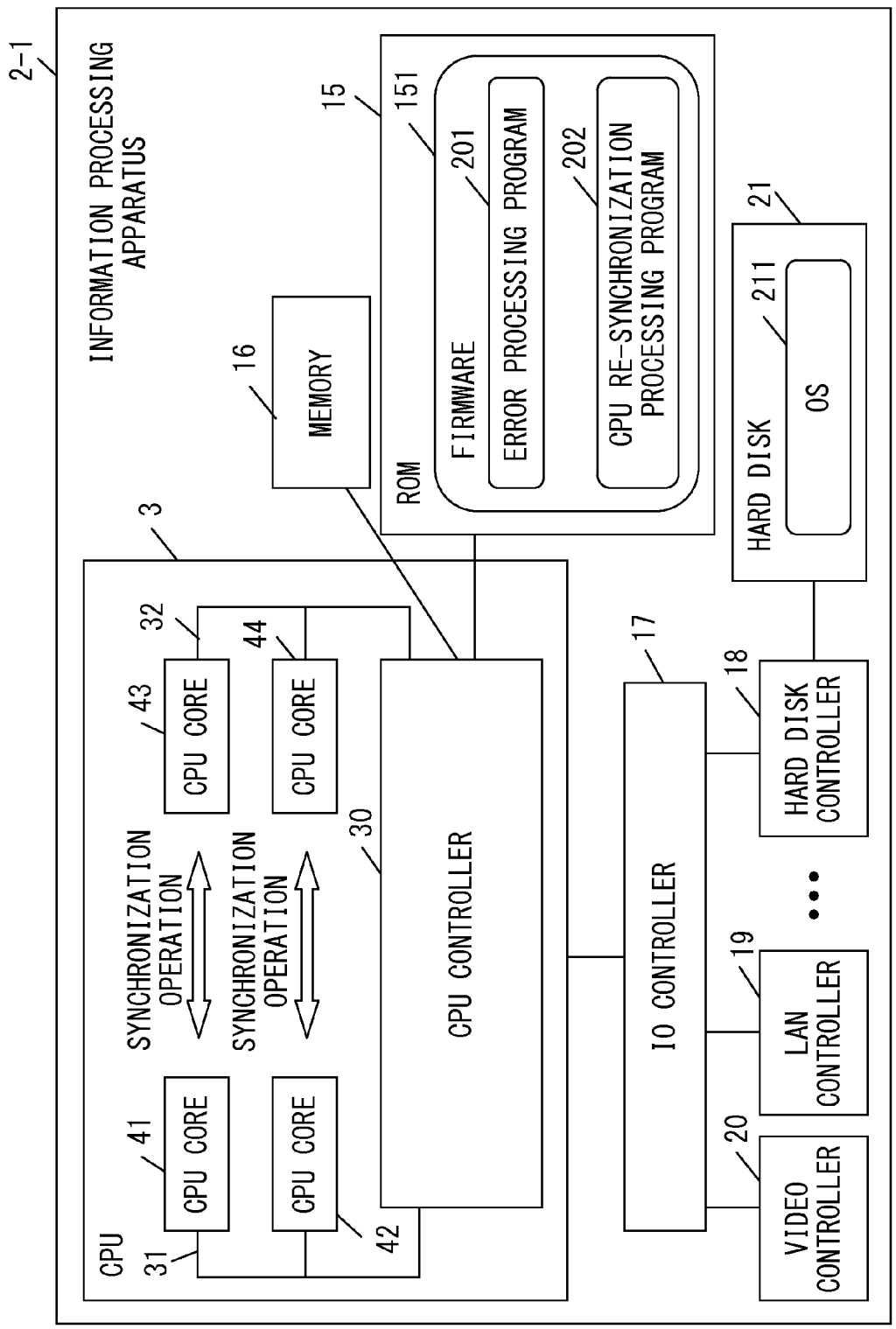
F I G. 2

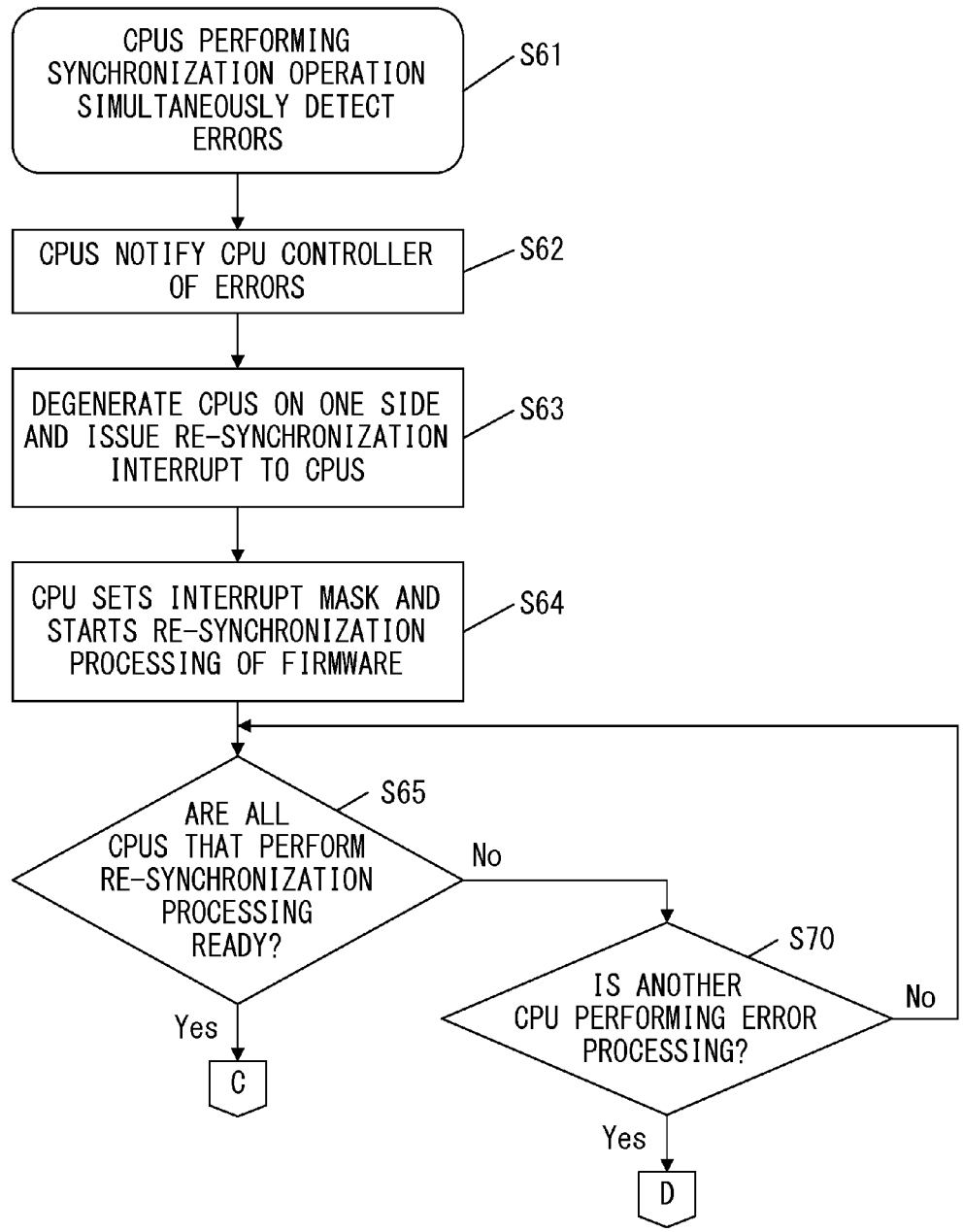
F I G. 8

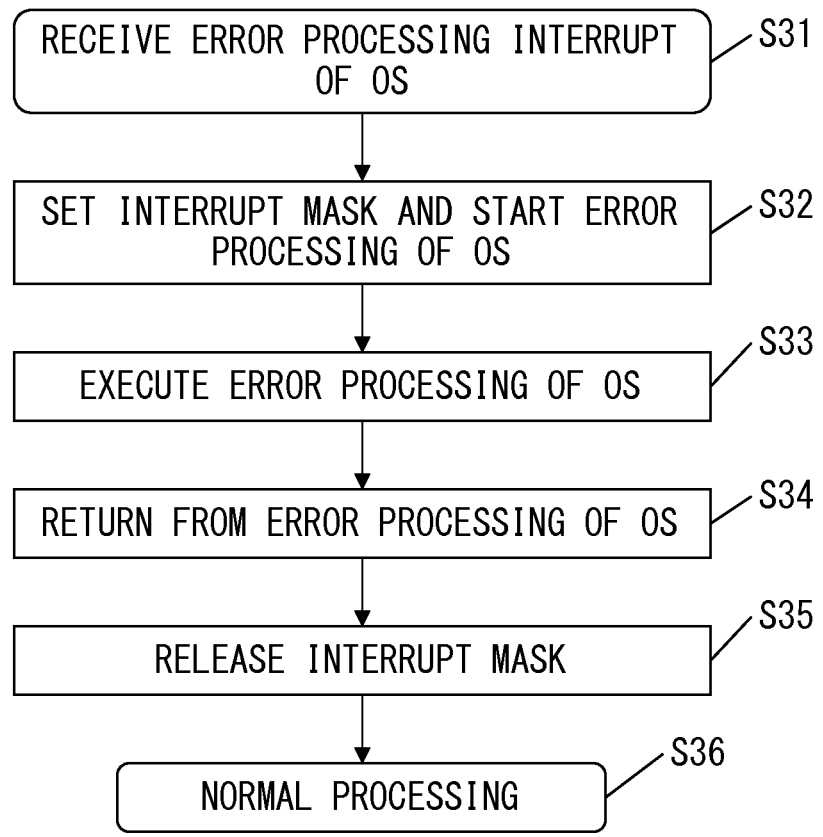
F I G. 2 6

INFORMATION PROCESSING APPARATUS FOR PERFORMING ERROR PROCESS WHEN CONTROLLERS IN SYNCHRONIZATION OPERATION DETECT ERROR SIMULTANEOUSLY

CROSS-REFERENCE TO RELATED APPLICATIONS

This application is a continuation application of International Application PCT/JP2009/001038 filed on Mar. 9, 2009 and designated the U.S., the entire contents of which are incorporated herein by reference.

FIELD

The present embodiment discussed herein relates to an information processing apparatus, a control method for the information processing apparatus, and a control program for the information processing apparatus.

BACKGROUND

First, a general CPU (Central Processing Unit) synchronization operation is explained. In a computer system required to have high reliability, a system for duplexing CPUs and causing the CPUs to operate in synchronization with each other to continue, when a failure occurs in one CPU, processing in the other CPU is adopted.

When the CPUs are caused to operate in synchronization with each other, in some case, a synchronization shift of the CPUs occurs because of the influence of a failure of the CPUs or a failure of an external device of the CPUs. The synchronization shift of the CPUs means that commands issued by the CPUs are different between the CPUs performing the synchronization operation. For example, addresses of read commands issued by the CPUs are different from each other between the CPUs performing the synchronization operation or timings for issuing the read commands shift by one clock. These cases correspond to the synchronization shift of the CPUs.

As a case in which the CPUs included in the computer system detect errors and the synchronization shift of the CPUs occurs, a case 1 and a case 2 described below are conceivable.

Case 1: One CPU of the CPUs performing the synchronization operation detects an error Case 2: Both the CPUs of the CPUs performing the synchronization operation simultaneously detect errors In general, it is desired to perform the following operations concerning the case 1 and the case 2. Concerning the case 1, the computer system degenerates the CPU that detects an error. Alternatively, until the number of times of error occurrence reaches a predetermined number of times or more, the computer system synchronizes the CPUs again and continues the synchronization operation. In the case 2, the computer system records error content and stops the computer system. However, when error content is recoverable, after recovering the errors, the computer system continues the operation in the CPU synchronization operation.

In the case in which the computer system adopts a configuration including a CPU controller connected to the CPUs, a general operation of the CPU controller performed when a synchronization shift occurs in the CPU is explained. The CPU controller is, for example, a chip set called north bridge.

When the CPU synchronization operation is performed, in general, the CPU controller performs control of, for example, detection of a synchronization shift and degeneration of the CPU on a side on which an error occurs. On the other hand, for example, in some CPUs of an INTEL (registered trademark) architecture, when the CPUs are degenerated, it is possible to degenerate the CPUs only in a unit of CPUs connected to the CPU controller by a common bus. Specifically, when the computer system adopts a configuration in which plural CPUs are connected on the common bus, when the computer system adopts a configuration in which plural CPU cores are mounted in one CPU, or when plural logical CPUs operate in one CPU core, a synchronization shift occurs in a certain one CPU, and then, the CPU controller degenerates all the CPUs connected to the CPU, in which the synchronization shift occurs, by the common bus. When the synchronization shift occurs in the certain one CPU, all the CPUs connected to the CPU, in which the synchronization shift occurs, on the common bus need to execute re-synchronization processing.

A case in which the re-synchronization processing for the CPUs is performed using a general-purpose OS (Operating System) such as Windows (registered trademark) is explained. In the general-purpose OS such as Windows, a manufacturer of the OS and a manufacture of the computer system are different. Since the general-purpose OS has to operate in computer systems of various specifications, it is difficult for the general-purpose OS to perform processing specialized for the specifications of the computer systems. Therefore, when processing for coping with the synchronization shift of the CPUs is performed in the general-purpose OS, it is necessary to perform, without the support of the OS, processing not to affect a normal operation of the OS. Specifically, it is necessary to perform processing explained in (1) and (2) below.

(1) When a synchronization shift of the CPUs is detected, an interrupt for passing control to processing by firmware such as a BIOS (Basic Input/Output System) of the computer system (hereinafter referred to as a synchronization shift interrupt) is issued and the re-synchronization processing is performed in the processing by the firmware such as the BIOS.

(2) To prevent the processing of the OS from being affected, during the re-synchronization processing, for example, the interrupt is masked to perform the re-synchronization processing in minimum time.

A general operation of the computer system performed when a fault occurs in a device other than the CPUs is explained. When a fault occurs in a device other than the CPUs, in some case, both the CPUs performing the synchronization operation simultaneously detect errors. For example, when the CPUs perform read from an IO (Input Output) device such as a video controller or a LAN controller, a hardware fault occurs in the IO device. When the hardware fault occurs in the IO device, the IO controller detects the fault and returns data for informing the CPUs of the occurrence of the fault (e.g., data generally called Poison data). As a result, both the CPUs performing the synchronization operation simultaneously read the data for informing of the occurrence of the fault and detect errors.

When the CPUs performing the synchronization operation simultaneously detect errors caused by a fault of a device other than the CPUs, the CPUs often can continue the synchronization operation. This is because, since the CPUs performing the synchronization operation detect errors of completely the same content, kinds of error processing are also often completely the same. On the other hand, when both the CPUs performing the synchronization operation simultaneously detect error, the CPU controller cannot determine whether the CPUs themselves cause the errors or a device other than the CPUs causes the errors or whether the CPUs can perform fault analysis processing while keeping performing the synchronization operation or cannot perform the fault analysis processing. Therefore, the CPU controller needs to determine in advance whether, when both the CPUs simultaneously detect errors, the CPU controller processes the errors as a synchronization shift or processes the errors while the CPUs keep performing the synchronization operation. However, when the CPU controller determines in advance that the CPU controller performs processing while the CPUs keep performing the synchronization operation, thereafter, when a synchronization shift occurs, it is difficult to determine whether the synchronization shift occurs during the fault analysis processing or whether the synchronization shift occurs after the completion of the fault analysis processing or whether a cause of the synchronization shift is an original CPU error or is a new cause. During the failure analysis processing, when a synchronization shift is caused by the original CPU error, the CPU controller only has to perform processing regarding that an error occurs once. However, when a synchronization shift is caused by another cause after the completion of the fault analysis processing, the CPU controller needs to perform processing regarding that errors occur twice. In other words, when the CPU controller determines that the CPU controller processes the errors while the CPUs keep performing the synchronization operation, it is difficult to correctly perform processing when another error occurs after that. Therefore, when both the CPUs performing the synchronization operation simultaneously detect errors, in general, the CPU controller processes the errors as a synchronization shift and the firmware such as the BIOS determines, for example, necessity of re-synchronization.

For example, the operations of a computer system including a CPU controller that processes, when both CPUs performing a synchronization operation simultaneously detect errors, the errors as a synchronization shift are explained.

Firmware such as a BIOS needs to perform operations described in (a) and (b) below as fault analysis processing performed when the CPUs performing the synchronization operation simultaneously detect errors.

(a) The firmware applies the fault analysis processing to the errors detected by the CPUs.

(b) When the errors are recoverable, after recovering the errors, the firmware re-synchronizes the CPUs and continues the synchronization operation.

Processing for realizing the operations described in (a) and (b) above and performed when the CPUs performing the synchronization operation simultaneously detect errors is explained with reference to FIGS. 23 to 26.

FIGS. 23 and 24 are examples of a flow of operation processing performed when the CPUs detect errors. First, (hardware of) the CPUs detect errors (step S1 in FIG. 23). The CPUs set an interrupt mask and start error processing by firmware (e.g., a BIOS) (step S2). Subsequently, the CPUs investigate a cause of the errors according to an instruction of the firmware and log the errors (step S3). Subsequently, the CPUs determine, according to an instruction of the firmware, whether a fault is recoverable (step S4). When the CPUs determine in step S4 that the fault is recoverable, the CPUs execute fault recovery processing according to an instruction of the firmware (step S10) and proceed to step S12 in FIG. 24. When the CPUs determine that the fault is not recoverable, the CPUs call error processing of an OS according to an instruction of the firmware (step S5 in FIG. 23). The error processing of the OS is error processing instructed by the OS. The CPUs start the error processing of the OS (step S6).

Subsequently, the CPUs issue an interrupt in the error processing of the OS to another CPU connected by a common bus (step S7 in FIG. 24). The interrupt in the error processing of the OS is an interrupt for causing the other CPU to execute the error processing of the OS. In step S7, the CPUs further execute the error processing in synchronization with the other CPU.

Subsequently, the OS determines whether the fault is recoverable (step S8). When the OS determines that the fault is unrecoverable, the OS stops the system (step S9). When the OS determines that the fault is recoverable, the OS performs the fault recovery processing and performs processing for return to the error processing of the firmware (step S11). Subsequently, the CPUs return from the error processing according to an instruction of the firmware (step S12). The CPUs release the interrupt mask (step S13) and return to normal processing (step S14).

FIG. 25 is an example of a flow of operation processing performed when the CPU controller issues a re-synchronization interrupt. First, both the CPUs performing the synchronization operation simultaneously detect errors (step S21). Subsequently, both the CPUs simultaneously perform error notification to the CPU controller (step S22). Subsequently, the CPU controller degenerates one CPU (the CPU on one side) and issues a re-synchronization interrupt to the CPU not degenerated and another CPU connected to a bus common to the CPU (step S23). The re-synchronization interrupt is an interrupt for notifying that a synchronization shift occurs. Subsequently, the CPUs set an interrupt mask and start re-synchronization processing of the firmware, i.e., re-synchronization processing conforming to an instruction of the firmware (step S24). The CPUs determine, according to an instruction of the firmware, whether all CPUs that perform the re-synchronization processing are ready (step S25). When the CPUs determine that CPUs that perform the re-synchronization processing are not ready, the CPUs return to step S25. When the CPUs determine that all CPUs that perform the re-synchronization processing are ready, the CPUs execute the re-synchronization processing according to an instruction of the firmware (step S26). Subsequently, the CPUs return from the re-synchronization processing according to an instruction of the firmware (step S27). Subsequently, the CPUs release the interrupt mask (step S28) and return to the normal processing (the CPU synchronization operation) (step S29).

FIG. 26 is an example of a flow of operation processing of the CPU that receives the error processing interrupt of the OS issued in step S7 in FIG. 24. When the CPU receives the error processing interrupt of the OS (step S31), the CPU sets an interrupt mask and starts error processing of the OS (step S32). In other words, the CPU executes the error processing of the OS according to an instruction of the OS (step S33). When the CPU returns from the error processing of the OS (step S34), the CPU releases the interrupt mask (step S35) and returns to the normal processing (step S36).

FIGS. 27 to 34 are diagrams illustrating detailed examples of processing performed when the CPUs performing the synchronization operation simultaneously detect errors. FIG. 27 illustrates an example of a state in which the CPUs are performing the synchronization operation and do not detect errors. In FIG. 27, a CPU 100 and a CPU 102 are performing the synchronization operation. A CPU 101 and a CPU 103 are performing the synchronization operation. The CPU 100 and the CPU 101 are connected to a CPU controller 104 via a common bus 105. The CPU 102 and the CPU 103 are connected to the CPU controller 104 via a common bus 106. The respective CPUs are executing the normal processing (the normal processing of the OS) (see #1 to #4 in FIG. 27).

FIG. 28 illustrates an example of a state in which both the CPUs performing the synchronization operation detect errors. In this example, the CPU 100 and the CPU 102 simultaneously detect errors (see #5 and #6 in FIG. 28). The CPU 100 and the CPU 102 that detect errors notify the CPU controller 104 that the errors are detected (see #7 in FIG. 28). Subsequently, the CPU 100 and the CPU 102 start error processing of the firmware (see #8 and #9 in FIG. 28).

FIG. 29 is an example of a state in which the CPU controller degenerates one of the CPUs that detect errors and a CPU connected to a bus common to the CPU. In this example, the CPU controller 104 degenerates the CPU 102 and the CPU 103 connected to the CPU 102 by the bus 106 (see #10 in FIG. 29). When timings of the error detection are different, the CPU controller 104 may degenerate the CPU that detects the error earlier. Subsequently, the CPU controller 104 issues a re-synchronization interrupt to the CPU 100 and the CPU 101 that are CPUs not degenerated (#11 in FIG. 29).

FIG. 30 illustrates an example of a state in which the CPUs not degenerated receive a re-synchronization interrupt. In this example, the CPU 100 that detects an error and the CPU 101 that does not detect an error execute operations explained below. The CPU 100 executes the error processing of the firmware. The re-synchronization interrupt is put on pending (see #12 in FIG. 30). The CPU 101 starts the re-synchronization processing of the CPU after setting an interrupt mask. The re-synchronization processing of the CPU needs to be completed in a short time. Therefore, the CPU 101 executes the re-synchronization processing of the CPU while keeping the interrupt mask state (see #13 in FIG. 30).

FIG. 31 illustrates an example of a state in which the CPU 100 that executes the error processing of the OS issues an error processing interrupt of the OS to the CPU 101. The CPU 100 executes the error processing of the OS (see #14 in FIG. 31) and issues an error processing interrupt of the OS to the CPU 101 (see #15 in FIG. 31). On the other hand, the CPU 101 executes the re-synchronization processing regardless of the fact that the CPU 101 receives the error processing interrupt of the OS from the CPU 100. In other words, since the CPU 101 is in the interrupt mask state, the CPU 101 cannot execute the error processing of the OS (see #16 in FIG. 31).

FIG. 32 illustrates an example of a state in which the CPU 100 performs the recovery processing for an error. The CPU 100 executes the error processing of the OS. When fault recovery is possible, fault recovery processing is performed (see #17 in FIG. 32).

FIG. 33 illustrates an example of a state in which the CPU 100 returns from the error processing. The CPU 100 returns from the error processing to the normal processing, receives the pending re-synchronization interrupt, and starts the re-synchronization processing (#18 in FIG. 33).

FIG. 34 illustrates an example of a state after the CPU 100 and the CPU 101 complete the re-synchronization processing. When the CPU 100 and the CPU 101 complete the re-synchronization processing, the CPU 100 and the CPU 101 return to the normal processing of the OS (see #19 and #20 in FIG. 34). The CPU 100 and the CPU 101 respectively operate in synchronization with the CPU 102 and the CPU 103. As a result, the CPU 102 and the CPU 103 execute the normal processing (see #21 and #22 in FIG. 34).

The processing performed when the CPUs performing the synchronization operation simultaneously detect errors explained above with reference to FIGS. 27 to 34 has problems explained below. In the computer system that uses the general-purpose OS such as Windows, when error processing is performed, not only the CPU that detects an error but also the CPU that does not detect an error needs to perform the error processing. For example, when memory dump information during error occurrence is acquired in the error processing, an interrupt is issued to all CPUs of the computer system and, after cache information is copied to a memory, memory information is stored in a hard disk or the like and used, for example, when an error occurrence cause is investigated later.

However, as explained above with reference to FIG. 31, since the CPU 101, which is the CPU that does not detect an error, is in the interrupt mask state, the CPU 101 cannot execute the error processing of the OS regardless of the fact that the CPU 101 receives the error processing interrupt of the OS from the CPU 100. Therefore, in the processing explained above with reference to FIGS. 27 to 34, a problem occurs in that the CPU that does not detect an error cannot receive the error processing interrupt of the OS issued in the error processing of the general-purpose OS such as Windows and cannot execute the error processing.

There is proposed an FT (Fault Tolerant) computer system that performs duplexing control for an I/O device without altering the existing OS or I/O device driver.

Patent Document 1: Japanese Patent Application Laid-Open Publication No. 2006-172220

SUMMARY

According to an aspect of the embodiment, an information processing apparatus includes a degeneration control unit that degenerates, of a first controller group including the first controller and a second controller group including the second controller, the second control device group when a first controller and a second controller performing a synchronization operation with each other detect occurrence of errors; and a re-synchronization processing instructing unit that instruct a controller included in the first controller group to execute re-synchronization processing, wherein when another controller different from the first controller included in the first controller group receives the instruction for the execution of the re-synchronization processing, the another controller performs interrupt mask setting, and when the first controller included in the first controller group receives the instruction for the execution of the re-synchronization processing, the first controller withholds the execution of the re-synchronization processing, starts error processing, and instructs the controller that performs the interrupt mask setting to release the interrupt mask.

BRIEF DESCRIPTION OF DRAWINGS

FIG. 2 is a diagram illustrating another configuration example of the information processing apparatus according to the embodiment;

FIG. 8 is a diagram illustrating an example of a flow of operation processing performed when a CPU controller issues a re-synchronization interrupt;

FIG. 26 is an example of a flow of operation processing of a CPU that receives the error processing interrupt of the OS;

DESCRIPTION OF EMBODIMENTS

Figure 1:
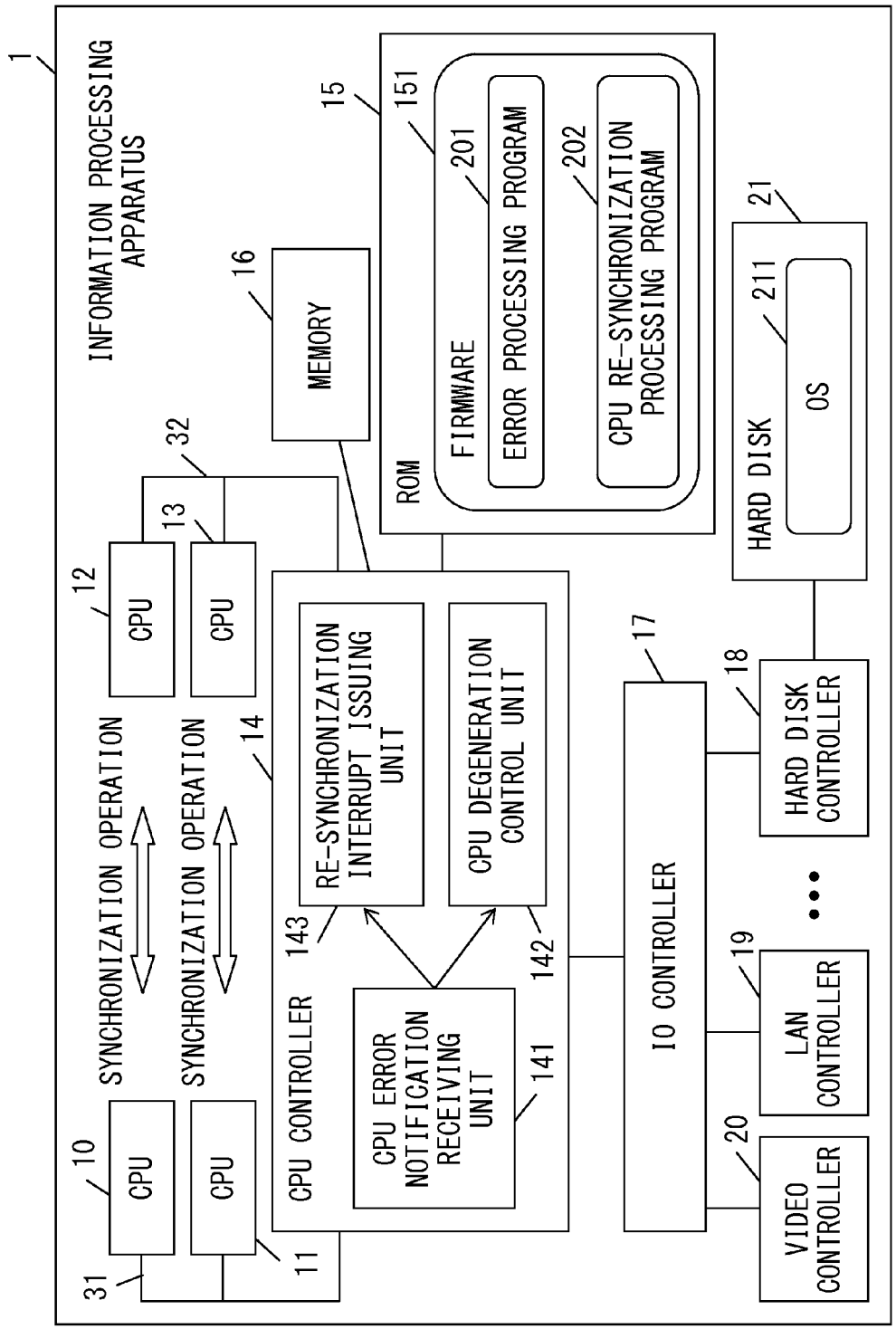
FIG. 1 is a diagram illustrating a configuration example of an information processing apparatus according to an embodiment of the present embodiment.

FIG. 1 is a diagram illustrating a configuration example of an information processing apparatus according to an embodiment of the present embodiment. An information processing apparatus 1 according to this embodiment includes CPUs 10 to 13, a CPU controller 14, a ROM (Read Only Memory) 15, a memory 16, an IO controller 17, a hard disk controller 18, a LAN controller 19, a video controller 20, and a hard disk 21.

In this embodiment, the CPU 10 and the CPU 12 perform a synchronization operation with each other and the CPU 11 and the CPU 13 perform the synchronization operation with each other. The CPU 10 and the CPU 11 are connected to the CPU controller 14 via a bus 31, which is a common bus. In other words, the CPU 10 and the CPU 11 form a first control device group. The CPU 12 and the CPU 13 are connected to the CPU controller 14 via a bus 32, which is a common bus. In other words, the CPU 12 and the CPU 13 form a second control device group.

When (hardware of) each of the CPUs detects occurrence of an error in the information processing apparatus 1, (the hardware of) the CPU notifies the CPU controller 14 of the occurrence of the error. The CPUs included in the control device group not degenerated by the CPU controller 14 explained later read, from the ROM 15, an error processing program 201 or a CPU re-synchronization processing program 202 included in firmware 151 such as a BIOS and execute processing corresponding to an instruction of the read program. Specifically, the CPUs that detect occurrence of errors read the error processing program 201 from the ROM 15 and execute processing conforming to an instruction of the error processing program 201 (error processing of the firmware). The CPUs that receive a re-synchronization interrupt issued from a re-synchronization interrupt issuing unit 143 of the CPU controller 14 explained later read the CPU re-synchronization processing program 202 from the ROM 15 and execute processing conforming to an instruction of the CPU re-synchronization processing program 202 (re-synchronization processing). When a fault is unrecoverable, the CPUs that execute the error processing of the firmware call error processing of an OS and execute error processing of an OS 211 stored in the hard disk 21.

The CPU controller 14 is, for example, a north bridge. The CPU controller 14 includes a CPU error notification receiving unit 141, a CPU degeneration control unit 142, and a re-synchronization interrupt issuing unit 143. When the CPUs performing the synchronization operation with each other, for example, the CPU 10 and the CPU 12 detect occurrence of errors, the CPU error notification receiving unit 141 receives, from the CPU 10 and the CPU 12, notification indicating that the errors occur. The CPU degeneration control unit 142 has a function of a degeneration control unit for degenerating the second control device group of the first control device group including the CPU 10 and the second control device group including the CPU 12. The re-synchronization interrupt issuing unit 143 issues a re-synchronization interrupt to the CPU included in the first control device group to thereby instruct execution of re-synchronization processing. The CPU that receives the issuance of the re-synchronization interrupt reads, after performing interrupt mask setting, the CPU re-synchronization processing program 202 from the ROM 15 and executes processing conforming to an instruction of the CPU re-synchronization processing program 202. Specifically, when the CPU 11 that does not detect occurrence of an error among the CPUs included in the first control device group receives the issuance of the re-synchronization interrupt, the CPU 11 performs interrupt mask setting. The CPU 10 that detects occurrence of an error among the CPUs included in the first control device group reads the error processing program 201 from the ROM 15 after the detection of the occurrence of the error. Therefore, even when the CPU 10 receives the issuance of the re-synchronization interrupt from the re-synchronization interrupt issuing unit 143, the CPU 10 puts the execution of the re-synchronization processing on pending (withholds the execution of the re-synchronization processing) and starts execution of error processing instructed by the error processing program 201. As an operation peculiar to this embodiment, the CPU 10 notifies, according to an instruction of the error processing program 201, the CPU 11 that the CPU 10 starts the error processing. The CPU 11 that receives this notification releases the interrupt mask setting. In other words, the CPU 10 instructs the CPU 11 that performs the interrupt mask setting to release the interrupt mask. Consequently, the CPU 11 changes to a state in which the CPU 11 can receive an error processing interrupt of the OS.

In the ROM 15, the firmware 151 is stored in advance. The firmware 151 includes the error processing program 201 and the CPU re-synchronization processing program 202. The error processing program 201 instructs the CPU (e.g., the CPU 10) that reads the error processing program 201 to execute the error processing of the firmware. The error processing program 201 instructs the CPU that reads the error processing program 201 to notify another CPU (e.g., the CPU 11) connected to the CPU by a common bus that this CPU (e.g., the CPU 10) starts the error processing of the firmware. The error processing program 201 determines whether a fault is recoverable concerning the CPU that executes the error processing. When the error processing program 201 determines that the fault is recoverable, (the CPU that receives an instruction of) the error processing program 201 notifies another CPU different from this CPU of completion of the error processing and issues a re-synchronization interrupt to the other CPU.

The CPU re-synchronization processing program 202 instructs the CPU that reads the CPU re-synchronization processing program 202 to execute normal re-synchronization processing of the CPU. Specifically, the CPU re-synchronization processing program 202 instructs the CPU that reads the CPU re-synchronization processing program 202 to determine whether all CPUs that perform the re-synchronization processing are ready. For example, the CPU re-synchronization processing program 202 instructs the CPU 10 that reads the CPU re-synchronization processing program 202 to determine whether the CPU 11 connected to the CPU 10 by a common bus is in a state in which the CPU 11 can execute the re-synchronization processing. Only when all the CPUs that perform the re-synchronization processing are ready, the CPU re-synchronization processing program 202 instructs the CPU (e.g., the CPU 10) to execute the re-synchronization processing. The CPU re-synchronization processing program 202 instructs the CPU that reads the CPU re-synchronization processing program 202 to determine whether another CPU different from this CPU is performing the error processing. When another CPU is performing the error processing, the CPU re-synchronization processing program 202 returns the CPU that reads the CPU re-synchronization processing program 202 from the re-synchronization processing to the normal processing and changes the CPU to a state in which the CPU can receive an interrupt from the OS.

In FIG. 1, as it is well known, the memory 16 is a storing section in which data necessary for execution of processing by each of the CPUs is stored. The IO controller 17 controls input and output of information between the CPU controller 14 and the video controller 20, the LAN (Local Area Network) controller 19, and the hard disk controller 18. The video controller 20 controls display processing for processing content of each of the CPUs on a monitor (not illustrated). The LAN controller 19 transmits the processing content of each of the CPUs to a LAN to which the information processing apparatus 1 belongs. The hard disk controller 18 controls data reading processing from the hard disk 21 and data writing processing in the hard disk 21. Functions of the information processing apparatus according to this embodiment are realized by the CPUs and a program executed on the CPUs. This computer program can be stored in a recording medium readable by a computer and is provided while being recorded in the recording medium or provided by transmission and reception using a network via a communication interface.

Figure 3:
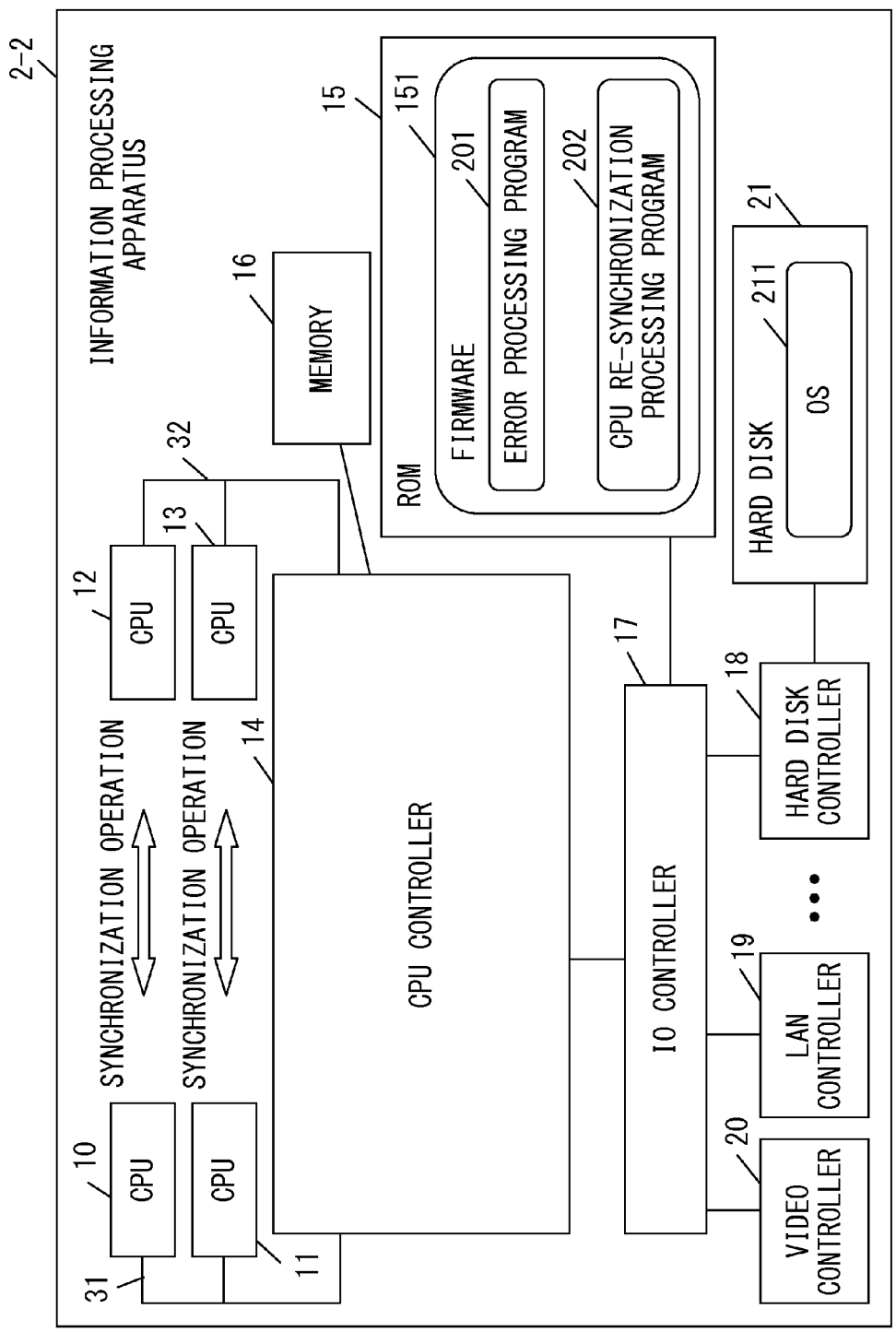
FIG. 3 is a diagram illustrating still another configuration example of the information processing apparatus according to the embodiment.

The information processing apparatus according to this embodiment may be an information processing apparatus 2-1 having a configuration illustrated in FIG. 2. In the information processing apparatus 2-1, a CPU controller 30 having a function (a CPU controller function) similar to that of the CPU controller 14 illustrated in FIG. 1 and CPU cores to 44 having functions similar to those of the CPUs illustrated in FIG. 1 are provided in one CPU 3. The information processing apparatus according to this embodiment may be an information processing apparatus 2-2 having a configuration illustrated in FIG. 3. In the information processing apparatus 2-2, the ROM 15 is connected to the IO controller 17.

Figure 4:
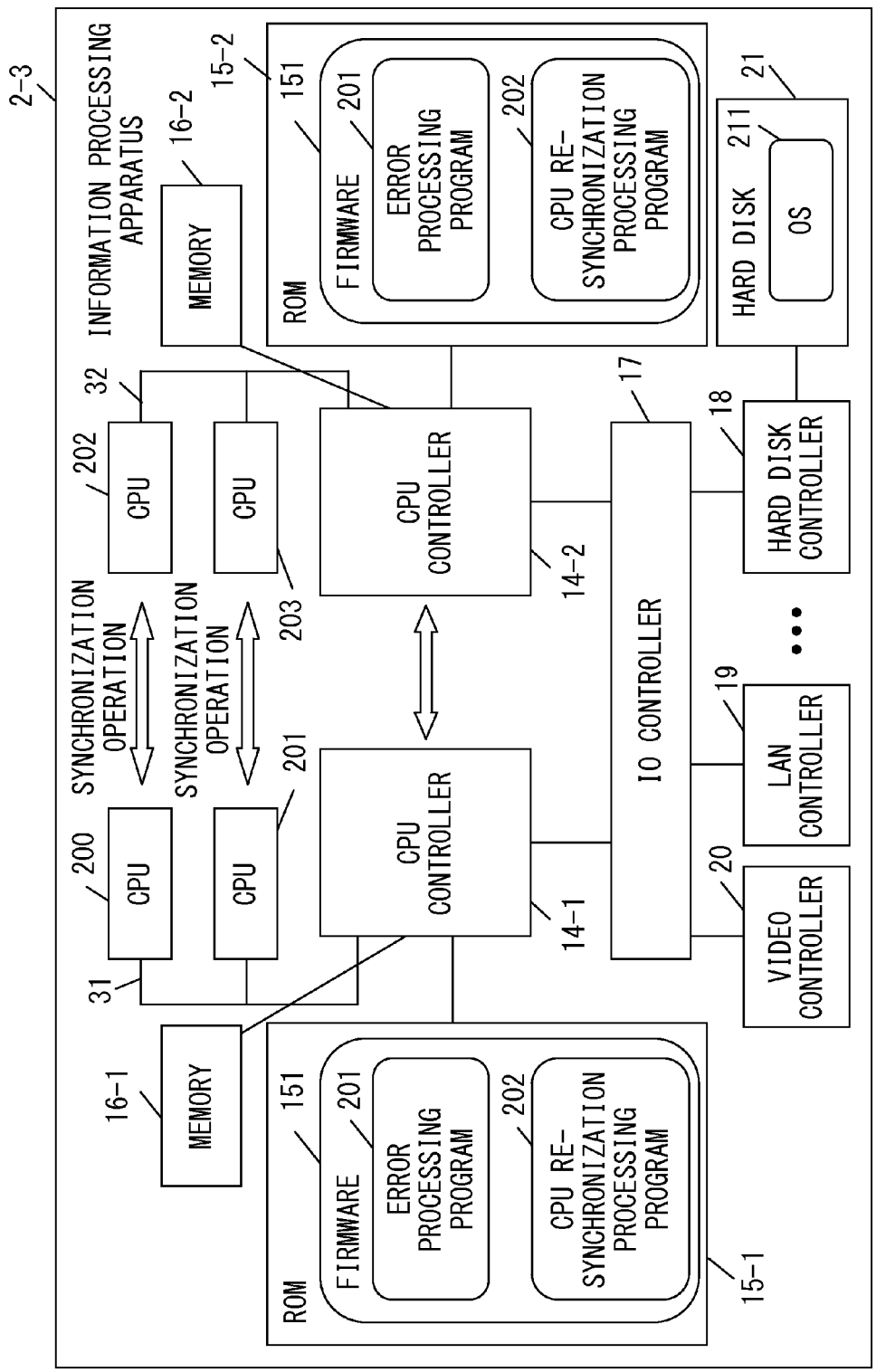
FIG. 4 is a diagram illustrating still another configuration example of the information processing apparatus according to the embodiment.

The information processing apparatus according to this embodiment may be an information processing apparatus 2-3 having a configuration illustrated in FIG. 4. The information processing apparatus 2-3 includes two CPU controllers 14-1 and 14-2. A CPU 200 and a CPU 201 are connected to the CPU controller 14-1. A CPU 202 and a CPU 203 are connected to the CPU controller 14-2. A memory 16-1 and a ROM 15-1 are connected to the CPU controller 14-1. A memory 16-2 and a ROM 15-2 are connected to the CPU controller 14-2. The memories 16-1 and 16-2 have a function similar to that of the memory 16 illustrated in FIG. 1. The ROM 15-1 and the ROM 15-2 have a function similar to that of the ROM 15 illustrated in FIG. 1. The CPU controllers 14-1 and 14-2 have a CPU controller function similar to that of the CPU controller 14 illustrated in FIG. 1. The CPU controllers 14-1 and 14-2 notify each other of operation states of CPUs connected thereto. Each of the CPU controllers 14-1 and 14-2 determines whether the CPUs connected thereto synchronize with the CPUs connected to the counterpart CPU controller. For example, the CPU controller 14-1 notifies the CPU controller 14-2 of operation states of the CPU 200 and the CPU 201. The CPU controller 14-2 determines whether the CPU 202 synchronizes with the CPU 200 and whether the CPU 203 synchronizes with the CPU 201. When each of the CPU controllers determines that the CPUs connected thereto do not synchronize with the CPUs connected to the other CPU controller, the CPU controller instructs the CPUs connected thereto to perform the re-synchronization processing (execute CPU synchronization processing control).

Figure 5:
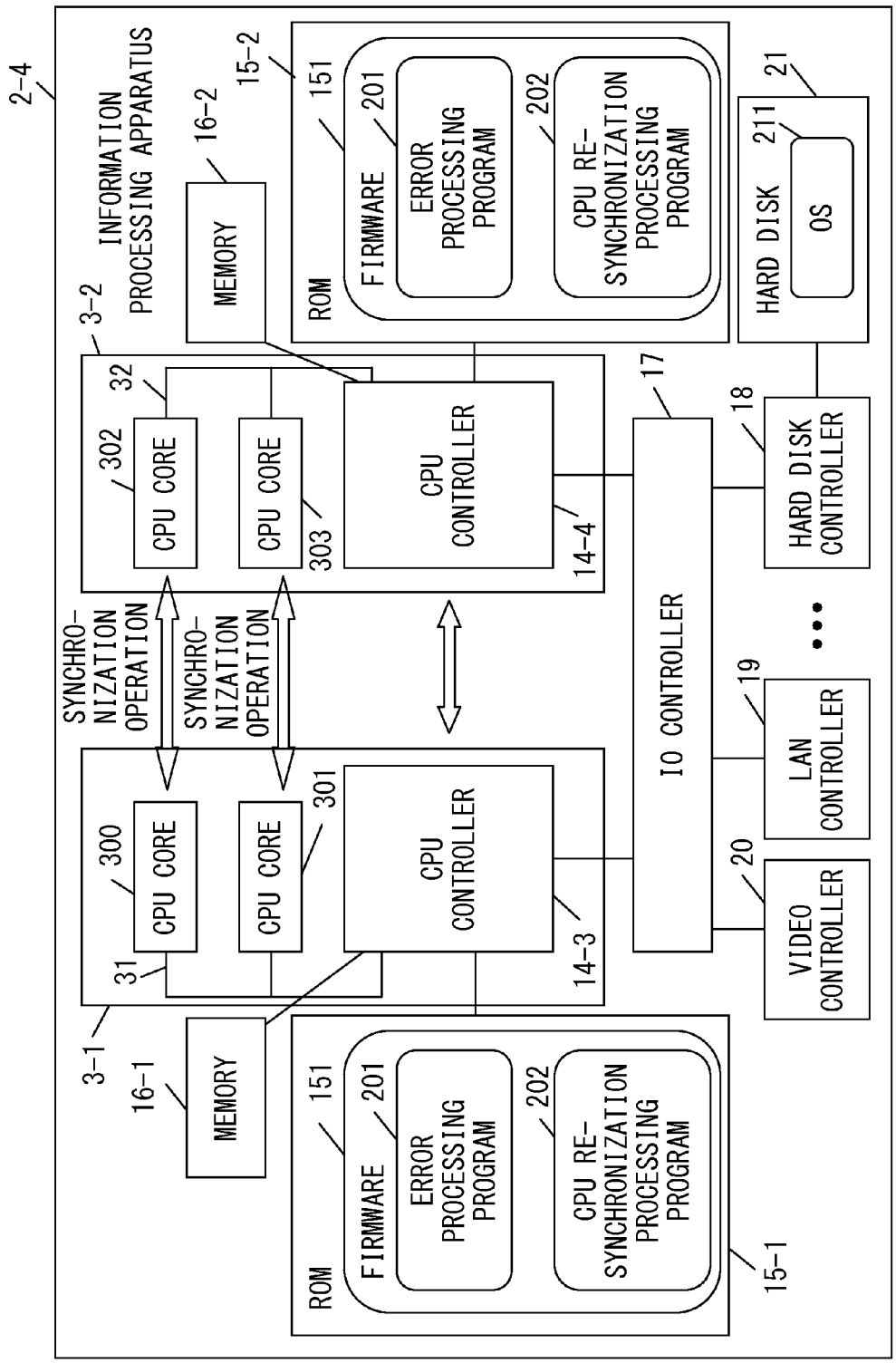
FIG. 5 is a diagram illustrating still another configuration example of the information processing apparatus according to the embodiment.

The information processing apparatus according to this embodiment may be an information processing apparatus 2-4 having a configuration illustrated in FIG. 5. In the information processing apparatus 2-4, a CPU controller 14-3 having a function similar to that of the CPU controller 14-1 illustrated in FIG. 4 and CPU cores 300 and 301 having functions similar to those of the CPUs 200 and 201 illustrated in FIG. 4 are provided in one CPU 3-1. A CPU controller 14-4 having a function similar to that of the CPU controller 14-2 illustrated in FIG. 4 and CPU cores 302 and 303 having functions similar to those of the CPUs 202 and 203 illustrated in FIG. 4 are provided in one CPU 3-2.

Figure 6:
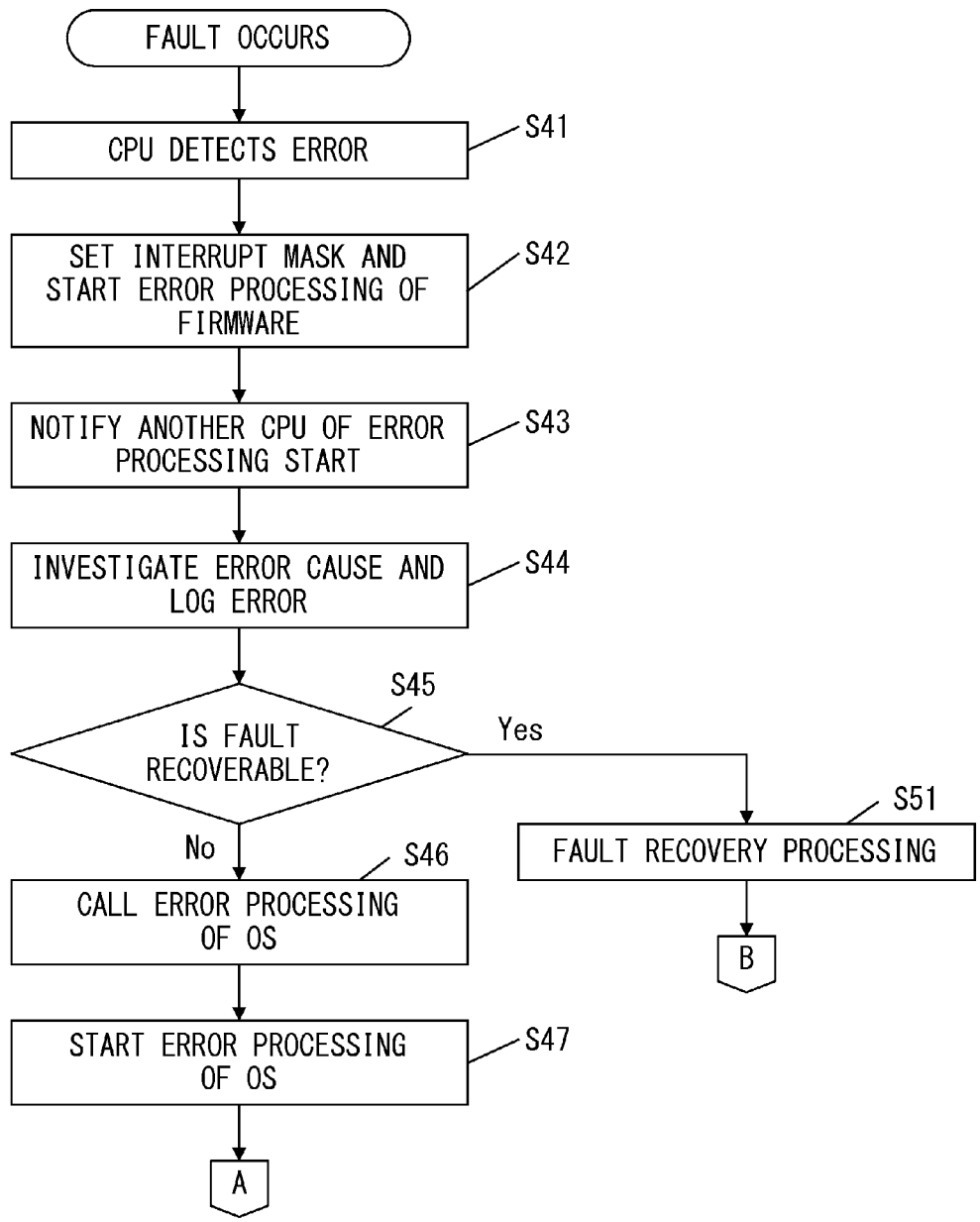
FIG. 6 is a diagram illustrating an example of a flow of operation processing performed when CPUs included in the information processing apparatus detect errors.
Figure 7:
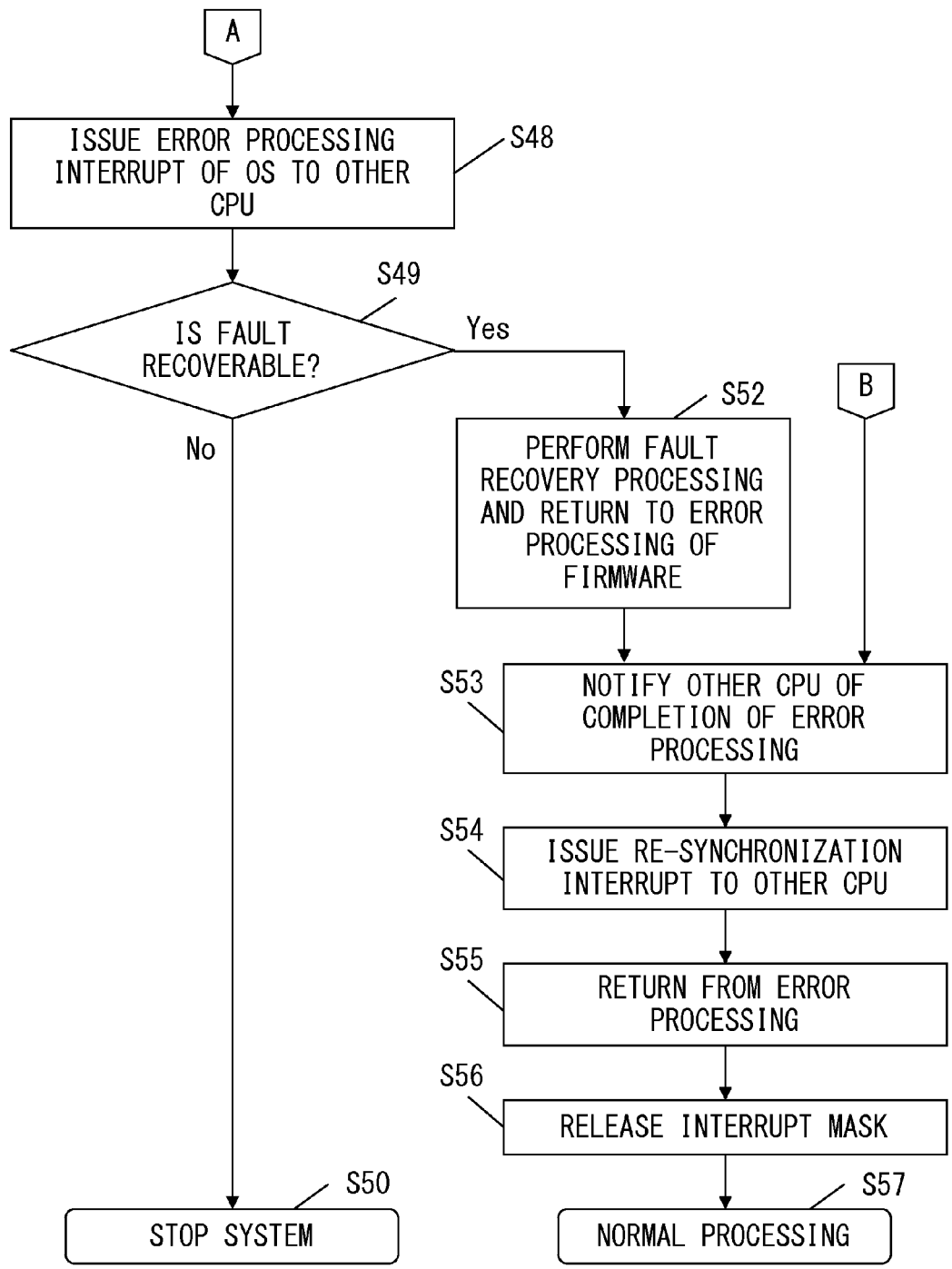
FIG. 7 is a diagram illustrating the example of the flow of the operation processing performed when the CPUs included in the information processing apparatus detect errors.

Processing performed when the CPUs performing the synchronization operation in the information processing apparatus 1 explained above simultaneously detect errors with reference to FIG. 1 is explained below with reference to FIGS. 6 to 22. FIGS. 6 and 7 are an example of a flow of operation processing performed when the CPUs included in the information processing apparatus 1 detect errors. It is assumed that the CPU 10 and the CPU 11 illustrated in FIG. 1 simultaneously detect errors. In FIGS. 6 and 7, operation processing of the CPU 10 that detects an error is explained as an example.

When a fault occurs in the information processing apparatus 1, the CPU 10 detects an error (step S41 in FIG. 6). The CPU 10 sets an interrupt mask and starts error processing of the firmware, i.e., the error processing conforming to an instruction of the error processing program 201 of the firmware 151 (step S42). Subsequently, the CPU 10 notifies, according to an instruction of the error processing program 201, the CPU 11 illustrated in FIG. 1 that the error processing of the firmware is started (step S43). Subsequently, the CPU 10 investigates a cause of the error and logs the error according to an instruction of the error processing program 201 (step S44). Subsequently, the CPU 10 determines whether the fault is recoverable according to an instruction of the error processing program 201 (step S45). When the CPU 10 determines in step S45 that the fault is recoverable, the CPU 10 executes the fault recovery processing according to an instruction of the error processing program 201 (step S51) and proceeds to step S53 in FIG. 7. When the CPU 10 determines that the fault is not recoverable, the CPU 10 calls the error processing of the OS according to an instruction of the error processing program 201 (step S46 in FIG. 6). The CPU 10 starts the error processing of the OS, i.e., the error processing instructed by the OS 211 (see FIG. 1) (step S47) and proceeds to step S48 in FIG. 7.

Subsequently, the CPU issues an error processing interrupt of the OS to the CPU 11, which is another CPU connected by the common bus 31 (step S48 in FIG. 7). Subsequently, the OS 211 determines whether the fault is recoverable (step S49). When the OS 211 determines that the fault is unrecoverable, the OS 211 stops the system (step S50). When the OS 211 determines that the fault is recoverable, the OS 211 performs the fault recovery processing and performs the return processing to the error processing of the firmware (step S52). Subsequently, the CPU 10 notifies the other CPU (the CPU 11) of the completion of the error processing according to an instruction of the error processing program 201 of the firmware 151 (step S53). The CPU 10 issues a re-synchronization interrupt to the other CPU (the CPU 11) according to an instruction of the error processing program 201 (step S54). The CPU 10 returns from the error processing according to an instruction of the error processing program 201 (step S55). The CPU 10 releases the interrupt mask (step S56) and returns to the normal processing (step S57).

Figure 9:
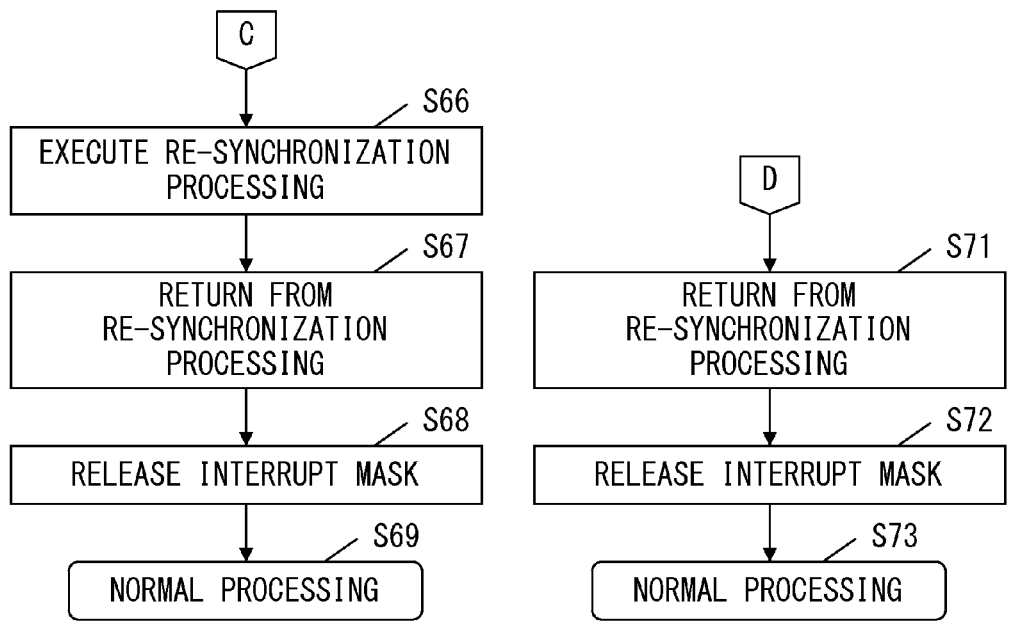
FIG. 9 is a diagram illustrating the example of the flow of the operation processing performed when the CPU controller issues the re-synchronization interrupt.

FIGS. 8 and 9 are an example of a flow of operation processing performed when the CPU controller issues a re-synchronization interrupt. First, the CPUs 10 and 12 performing the synchronization operation included in the information processing apparatus 1 illustrated in FIG. 1 simultaneously detect errors (step S61 in FIG. 8). Subsequently, the CPUs 10 and 12 simultaneously notify the CPU controller 14 of the errors (step S62). Subsequently, the CPU controller 14 degenerates the CPU 12 and the CPU 13 (the CPU on one side) connected to the CPU 12 by the bus 32 and issues a re-synchronization interrupt to the CPU 10 not degenerated and the CPU 11 connected to the CPU 10 by the bus 31 (step S63). The CPU 11 sets an interrupt mask and starts the re-synchronization processing of the firmware (step S64). Processing in step S64 and subsequent steps in FIG. 8 and processing in step S66 and subsequent steps and processing in step S71 and subsequent steps in FIG. 9 are processing common to the CPU 10 and the CPU 11. In this example, for example, the processing in the CPU 11 is explained. The CPU 11 determines, according to an instruction of the CPU re-synchronization processing program 202, whether all CPUs that perform the re-synchronization processing are ready, i.e., all the CPUs connected to the CPU 11 by the bus 31 are in a state in which the CPUs can execute the re-synchronization processing (step S65). In the example illustrated in FIG. 1, the CPU 11 determines whether the CPU 10 is in a state in which the CPU 10 can execute the re-synchronization processing. When the CPU 11 determines that all CPUs that perform the re-synchronization processing are ready, the CPU 11 executes the re-synchronization processing according to an instruction of the CPU re-synchronization processing program 202 (step S66 in FIG. 9). The CPU 11 returns from the re-synchronization processing according to an instruction of the CPU re-synchronization processing program 202 (step S67). Subsequently, the CPU 11 releases the interrupt mask (step S68) and returns to the normal processing (the CPU synchronization operation) (step S69).

When the CPU 11 determines in step S65 in FIG. 8 that all CPUs that perform the re-synchronization processing are not ready, the CPU 11 determines whether another CPU connected to the CPU 11 by the bus 31 is performing error processing (step S70 in FIG. 8). For example, the CPU 11 determines whether the CPU 10 is performing error processing. When the CPU 11 determines that another CPU is not performing error processing, the CPU 11 returns to step S65 in FIG. 8. When the CPU 11 determines that another CPU is performing error processing, the CPU 11 returns from the re-synchronization processing according to an instruction of the CPU re-synchronization processing program 202 (step S71 in FIG. 9). Subsequently, the CPU 11 releases the interrupt mask (step S72) and returns to the normal processing (CPU synchronization shift operation) (step S73).

Figure 10:
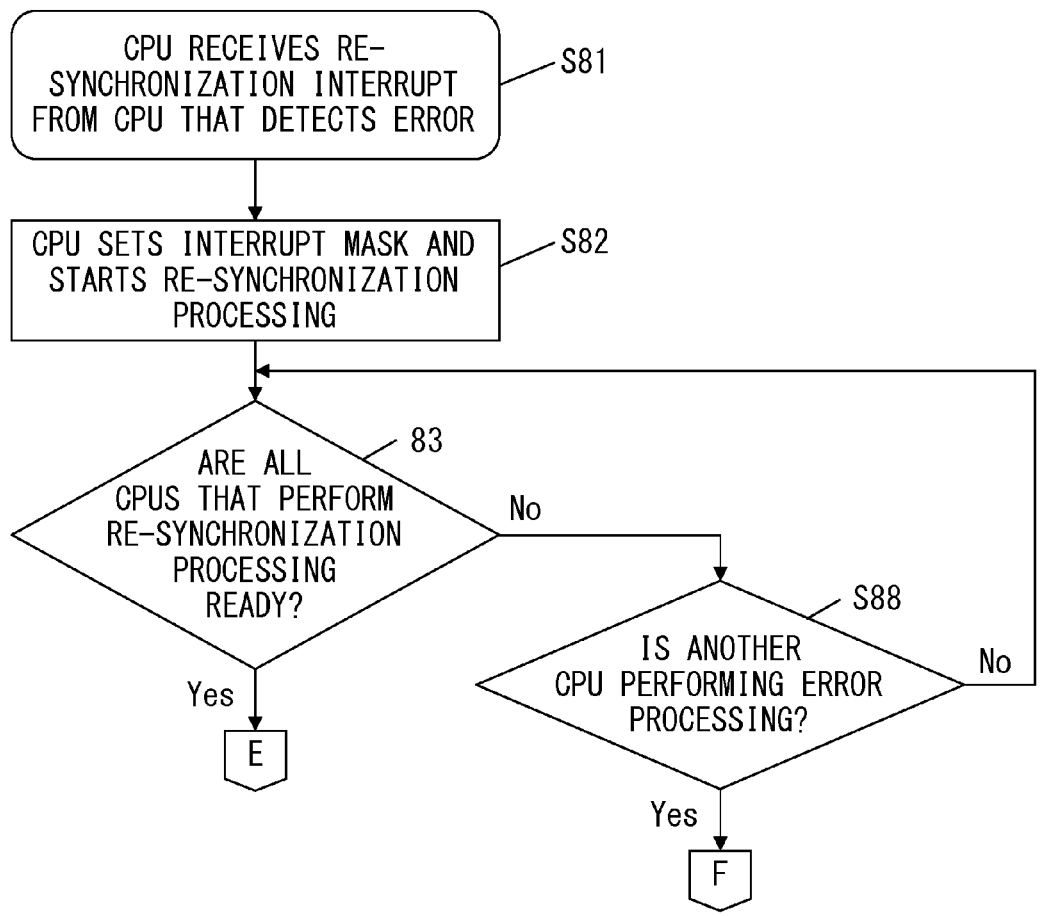
FIG. 10 is a diagram illustrating an example of a flow of operation processing of a CPU that receives the re-synchronization interrupt from the CPUs that detect errors.
Figure 11:
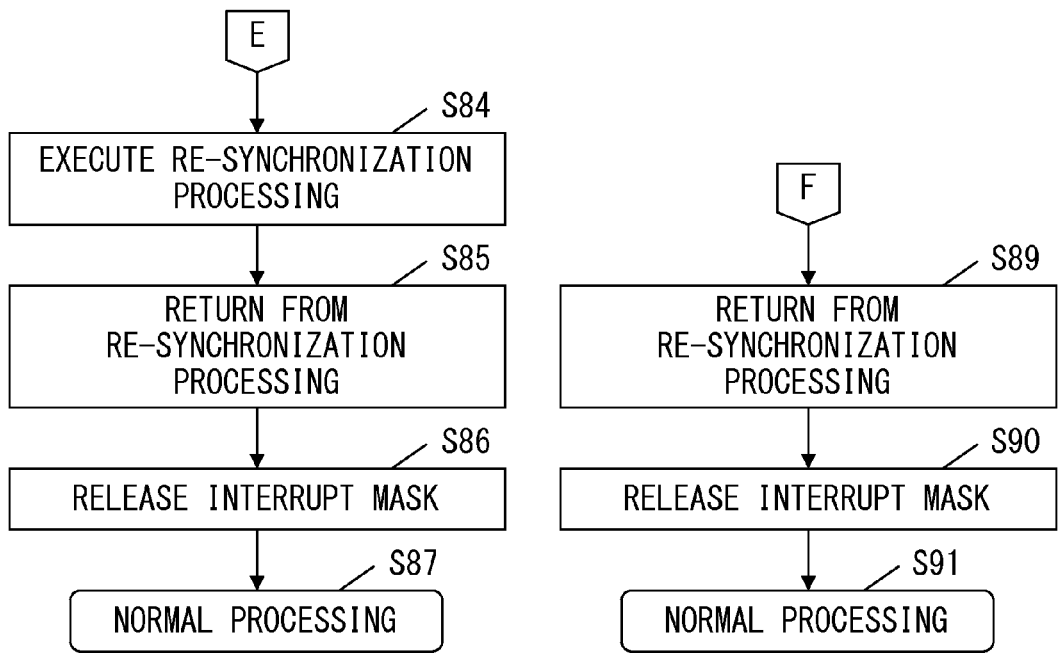
FIG. 11 is a diagram illustrating the example of the flow of the operation processing of the CPU that receives the re-synchronization interrupt from the CPUs that detect errors.

FIGS. 10 and 11 are an example of a flow of operation processing of a CPU that receives a re-synchronization interrupt from a CPU that detects an error. In FIGS. 10 and 11, operation processing of the CPU 11 that receives a re-synchronization interrupt from the CPU 10 (see FIG. 1) that detects an error is explained as an example.

First, the CPU 11 receives a re-synchronization interrupt from the CPU 10 that detects an error (step S81 in FIG. 10). The CPU 11 sets an interrupt mask and starts the re-synchronization processing according to an instruction of the CPU re-synchronization processing program 202 (step S82). Subsequently, the CPU 11 determines, according to an instruction of the CPU re-synchronization processing program 202, whether all CPUs that perform the re-synchronization processing are ready, i.e., whether all the CPUs connected to the CPU 11 by the bus 31 are in a state in which the CPUs can execute the re-synchronization processing (step S83). In the example illustrated in FIG. 1, the CPU 11 determines whether the CPU 10 is in a state in which the CPU 10 can execute the re-synchronization processing. When the CPU 11 determines that all CPUs that perform the re-synchronization processing are ready, the CPU 11 executes the re-synchronization processing according to an instruction of the CPU re-synchronization processing program 202 (step S84 in FIG. 11). The CPU 10 returns from the re-synchronization processing according to an instruction of the CPU re-synchronization processing program 202 (step S85). Subsequently, the CPU 10 releases the interrupt mask (step S86) and returns to the normal processing (the CPU synchronization operation) (step S87).

When the CPU 11 determines in step S83 in FIG. 10 that all CPUs that perform the re-synchronization processing are not ready, the CPU 11 determines whether another CPU connected to the CPU 11 by the bus 31 is performing error processing (step S88 in FIG. 10). For example, the CPU 11 determines whether the CPU 10 is performing error processing. When the CPU 11 determines that another CPU is not performing error processing, the CPU 11 returns to step S83 in FIG. 10. When the CPU 11 determines that another CPU is performing error processing, the CPU 11 returns from the re-synchronization processing according to an instruction of the CPU re-synchronization processing program 202 (step S89 in FIG. 11). Subsequently, the CPU 11 releases the interrupt mask (step S90) and returns to the normal processing (the CPU synchronization shift operation) (step S91).

Figure 12:
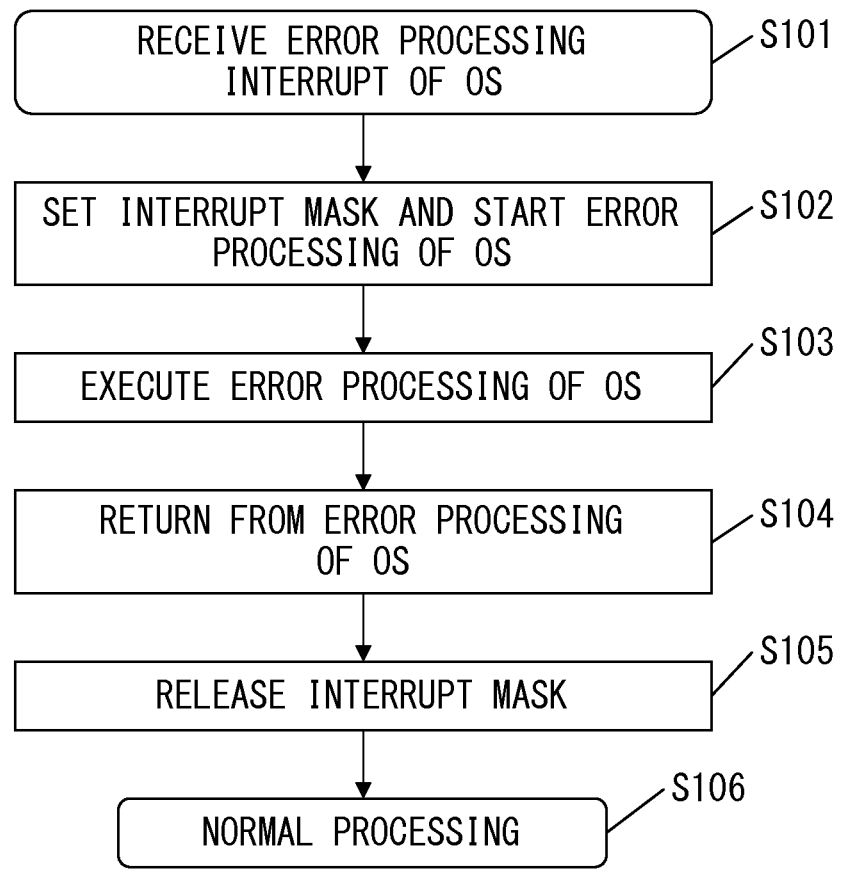
FIG. 12 is a diagram illustrating an example of a flow of operation processing of a CPU that receives an error processing interrupt of an OS.

FIG. 12 is an example of a flow of operation processing of a CPU that receives the error processing interrupt of the OS issued in step S48 in FIG. 7. When the CPU 11 receives the error processing interrupt of the OS (step S101), the CPU 11 sets an interrupt mask and starts the error processing of the OS (step S102). In other words, the CPU 11 executes the error processing of the OS according to an instruction of the OS (step S103). When the CPU 11 returns from the error processing of the OS (step S104), the CPU 11 releases the interrupt mask (step S105) and returns to the normal processing (step S106).

Figure 13:
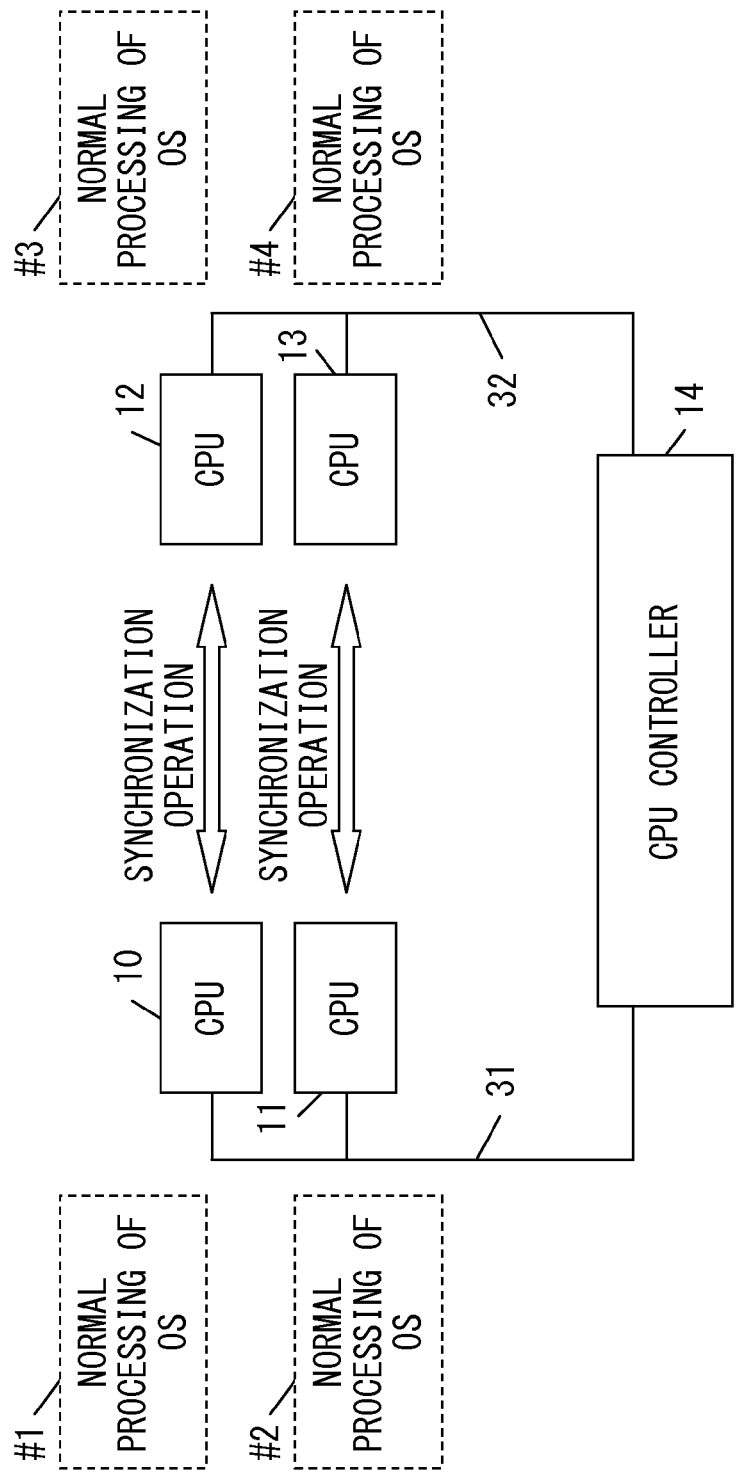
FIG. 13 is a diagram illustrating a detailed example of processing performed when CPUs performing a synchronization operation simultaneously detect errors.

FIGS. 13 to 22 are diagrams illustrating detailed examples of processing performed when the CPUs performing the synchronization operation simultaneously detect errors. FIG. 13 illustrates an example of a state in which the CPUs are performing the synchronization operation and do not detect errors. In FIG. 13, the CPU 10 and the CPU 12 are performing the synchronization operation. The CPU 11 and the CPU 13 are performing the synchronization operation. The CPU 10 and the CPU 11 are connected to the CPU controller 14 via the common bus 31. The CPU 12 and the CPU 13 are connected to the CPU controller 14 via the common bus 32. Each of the CPUs executes the normal processing of the OS (see #1 to #4 in FIG. 13).

Figure 14:
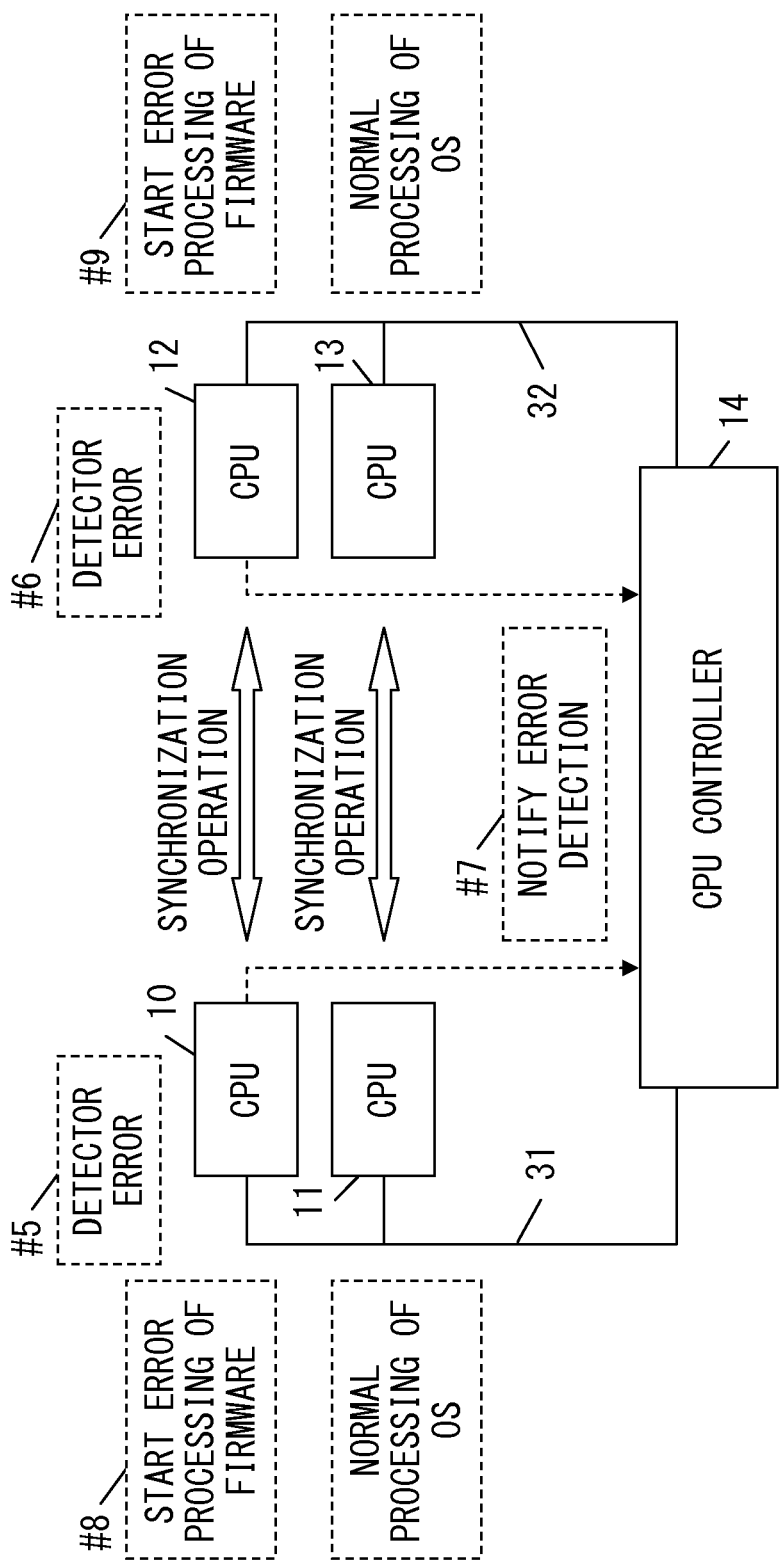
FIG. 14 is a diagram illustrating a detailed example of processing performed when the CPUs performing the synchronization operation simultaneously detect errors.

FIG. 14 illustrated an example of a state in which both CPUs performing the synchronization operation detect errors. In this example, the CPU 10 and the CPU 12 simultaneously detect errors (see #5 and #6 in FIG. 14). The CPU 10 and the CPU 12 that detect the errors notify the CPU controller 14 that the errors are detected (see #7 in FIG. 14). Subsequently, the CPU 10 and the CPU 12 start the error processing of the firmware (see #8 and #9 in FIG. 14).

Figure 15:
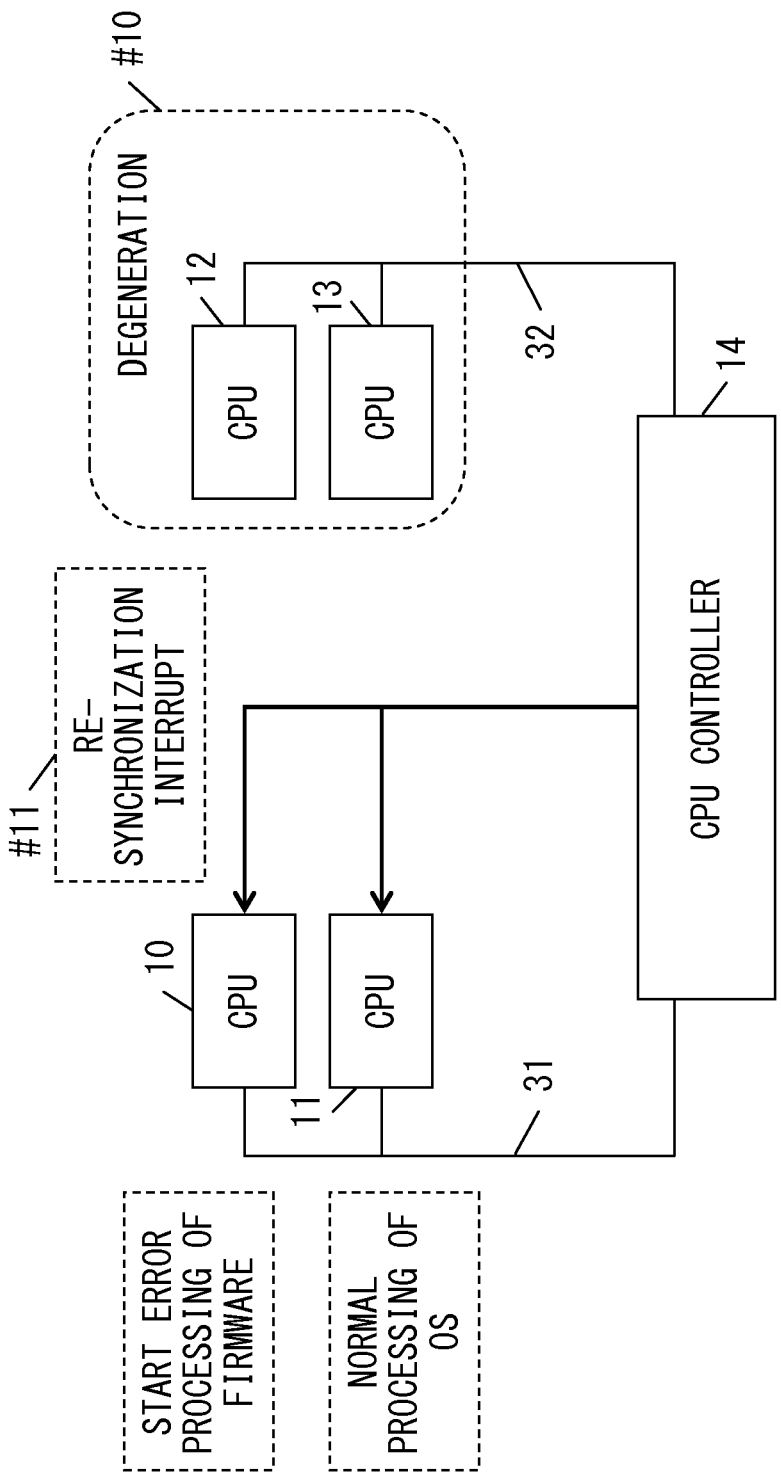
FIG. 15 is a diagram illustrating a detailed example of processing performed when the CPUs performing the synchronization operation simultaneously detect errors.

FIG. 15 illustrates an example of a state in which the CPU controller degenerates any one of the CPUs that detect errors and a CPU connected to a bus common to the CPU. In this example, the CPU controller 14 degenerates the CPU 12 and the CPU 13 connected to the CPU 12 by the bus 32 (see #10 in FIG. 15). When timings of error detection are different, the CPU controller 14 may degenerate a CPU that detects an error earlier. Subsequently, the CPU controller 14 issues a re-synchronization interrupt to the CPU 10 and the CPU 11, which are CPUs not degenerated (#11 in FIG. 15).

Figure 16:
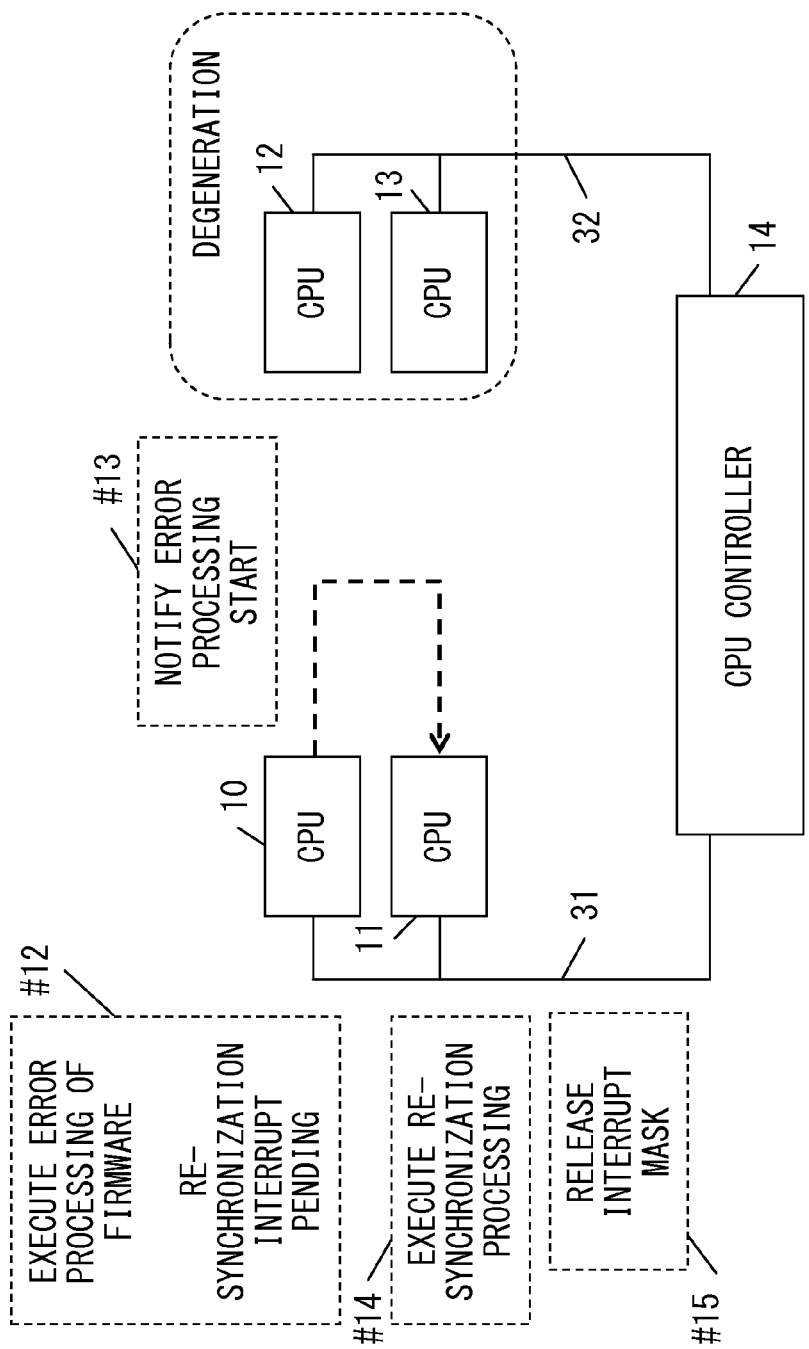
FIG. 16 is a diagram illustrating a detailed example of processing performed when the CPUs performing the synchronization operation simultaneously detect errors.

FIG. 16 illustrates an example of a state in which the CPUs not degenerated receive a re-synchronization interrupt from the CPU controller. In this example, the CPU 10 that detects an error and the CPU 11 that does not detect an error execute operations explained below. The CPU 10 executes the error processing of the firmware according to an instruction of the error processing program 201. A re-synchronization interrupt is put on pending (see #12 in FIG. 16). The CPU 10 notifies, according to an instruction of the error processing program 201, the CPU 11 that the error processing of the firmware is started (see #13 in FIG. 16). This notification processing corresponds to the processing in step S43 in FIG. 6 explained above. When the CPU 11 receives a re-synchronization interrupt from the CPU controller 14, the CPU 11 sets an interrupt mask and starts execution of the re-synchronization processing according to an instruction of the CPU re-synchronization processing program 202 (see #14 in FIG. 16). However, when the CPU 11 is notified from the CPU 10 that the error processing is started, in step S70 in FIG. 8 explained above, the CPU 11 determines that the CPU 10 is performing the error processing and returns from the re-synchronization processing (see step S71 in FIG. 9). As a result, the CPU 11 releases the interrupt mask and returns to the normal processing (see #15 in FIG. 16 and steps S72 and S73 in FIG. 9). Consequently, the CPU 11 changes to a state in which the CPU 11 can receive an error processing interrupt of the OS explained later with reference to FIG. 17.

Figure 17:
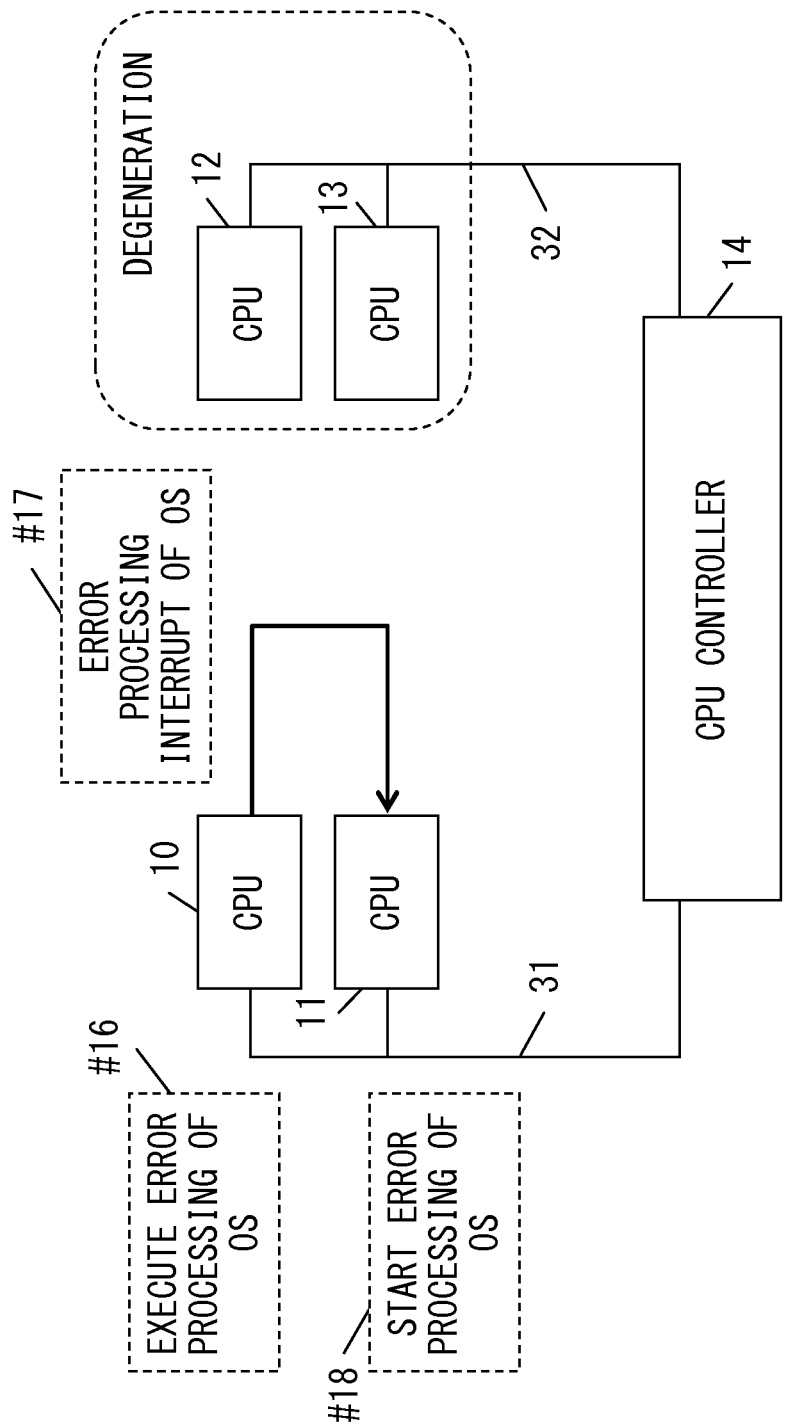
FIG. 17 is a diagram illustrating a detailed example of processing performed when the CPUs performing the synchronization operation simultaneously detect errors.

FIG. 17 illustrates an example of a state in which the CPU 10 that executes the error processing of the OS issues an error processing interrupt of the OS to the CPU 11. The CPU 10 executes the error processing of the OS (see #16 in FIG. 17) and issues an error processing interrupt of the OS to the CPU 11 (see #17 in FIG. 17). This processing corresponds to the processing in step S48 in FIG. 7. The CPU 11 receives the error processing interrupt of the OS from the CPU 10 and starts the error processing of the OS (see #18 in FIG. 17).

Figure 18:
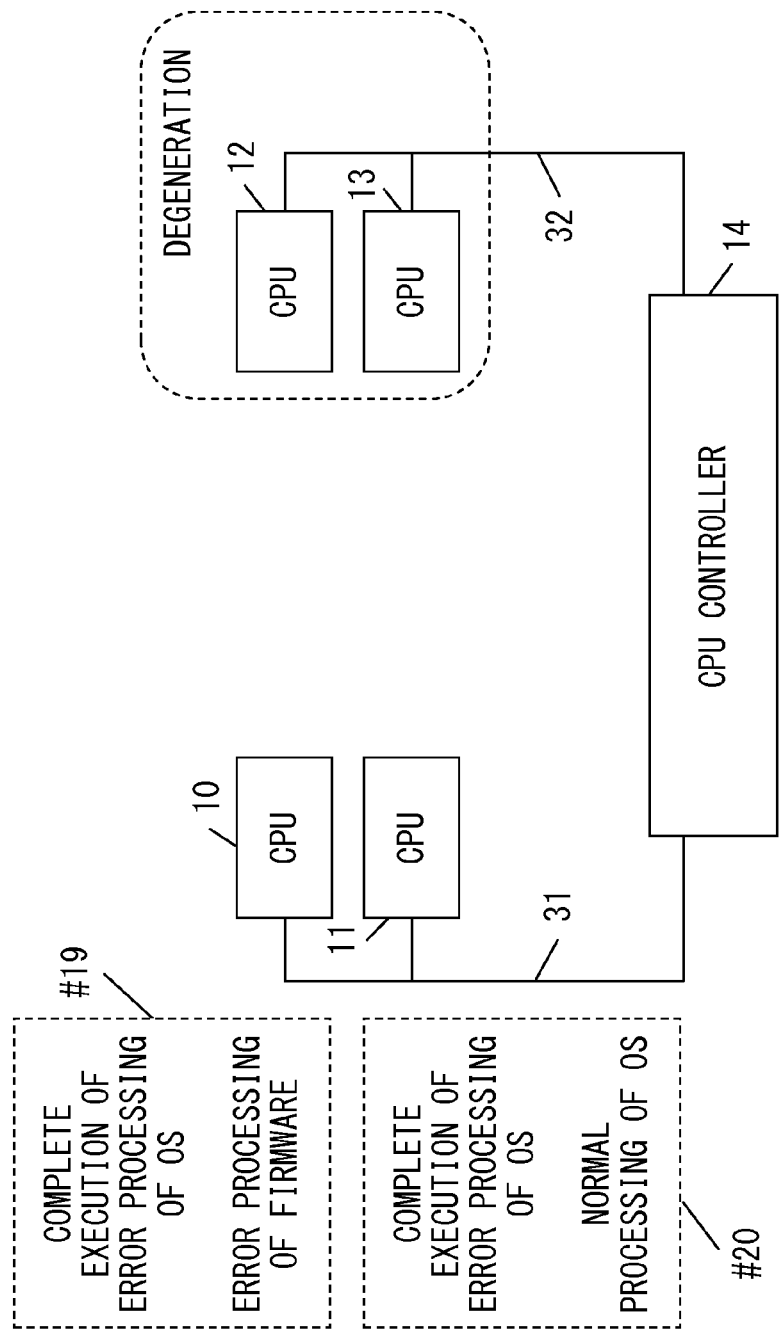
FIG. 18 is a diagram illustrating a detailed example of processing performed when the CPUs performing the synchronization operation simultaneously detect errors.

FIG. 18 illustrates an example of a state in which the CPUs 10 and 11 complete the execution of the error processing of the OS. The CPU 10 completes the execution of the error processing of the OS and returns to the error processing of the firmware (see #19 in FIG. 18). This processing corresponds to the processing in S52 in FIG. 7 explained above. The CPU 11 completes the execution of the error processing of the OS and returns to the normal processing (see #20 in FIG. 18). This processing corresponds to the processing in S106 in FIG. 12 explained above.

Figure 19:
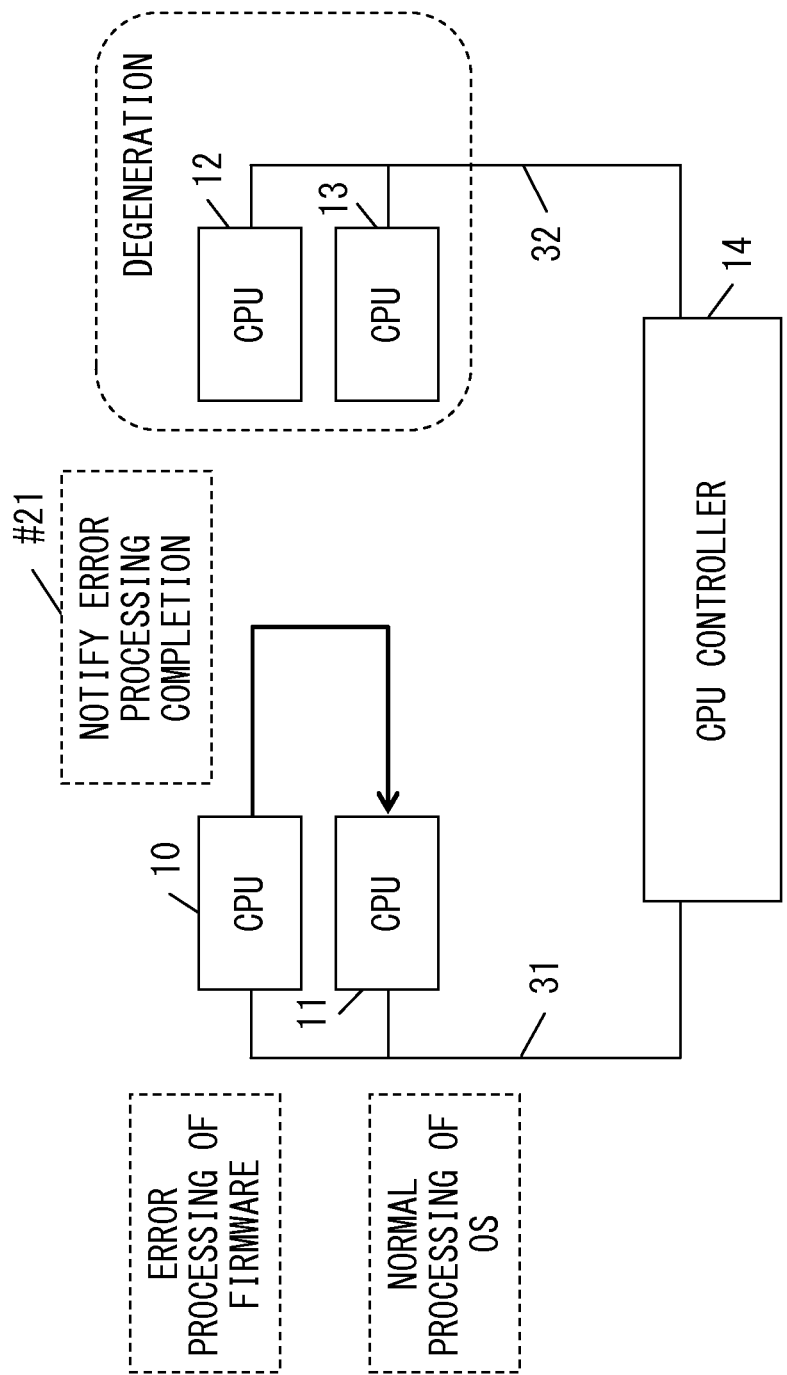
FIG. 19 is a diagram illustrating a detailed example of processing performed when the CPUs performing the synchronization operation simultaneously detect errors.

FIG. 19 illustrates an example of a state in which the CPU 10 notifies the CPU 11 of the completion of the error processing. The CPU 10 notifies, according to an instruction of the CPU re-synchronization processing program 202, the CPU 11 that the error processing is completed (see #21 in FIG. 19). This processing corresponds to the processing in step S53 in FIG. 7 explained above.

Figure 20:
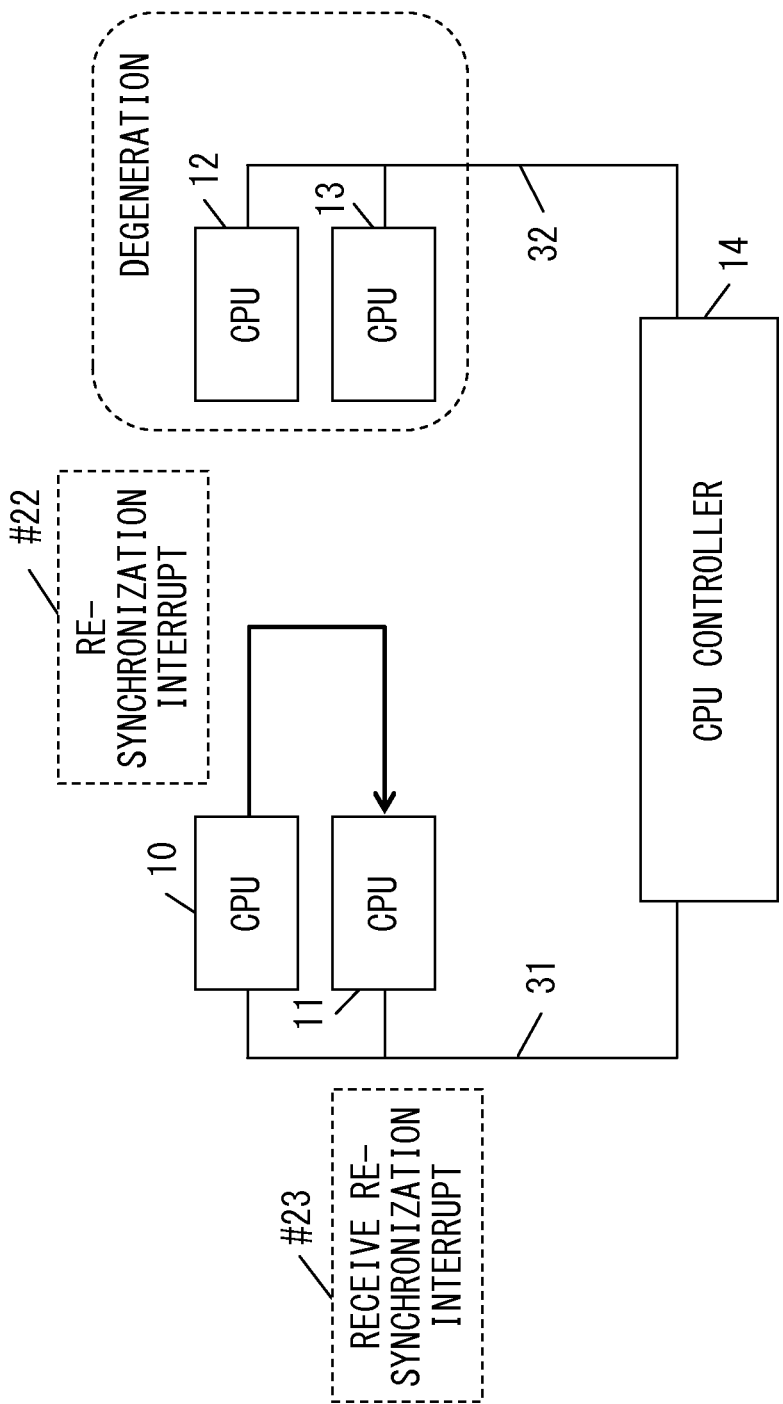
FIG. 20 is a diagram illustrating a detailed example of processing performed when the CPUs performing the synchronization operation simultaneously detect errors.

FIG. 20 illustrates an example of a state in which the CPU 10 issues a re-synchronization interrupt to the CPU 11. The CPU 10 issues a re-synchronization interrupt to the CPU 11 according to an instruction of the CPU re-synchronization program 202 (see #22 in FIG. 20). This processing corresponds to the processing in step S54 in FIG. 7 explained above. The CPU 11 receives the re-synchronization interrupt (see #23 in FIG. 20).

Figure 21:
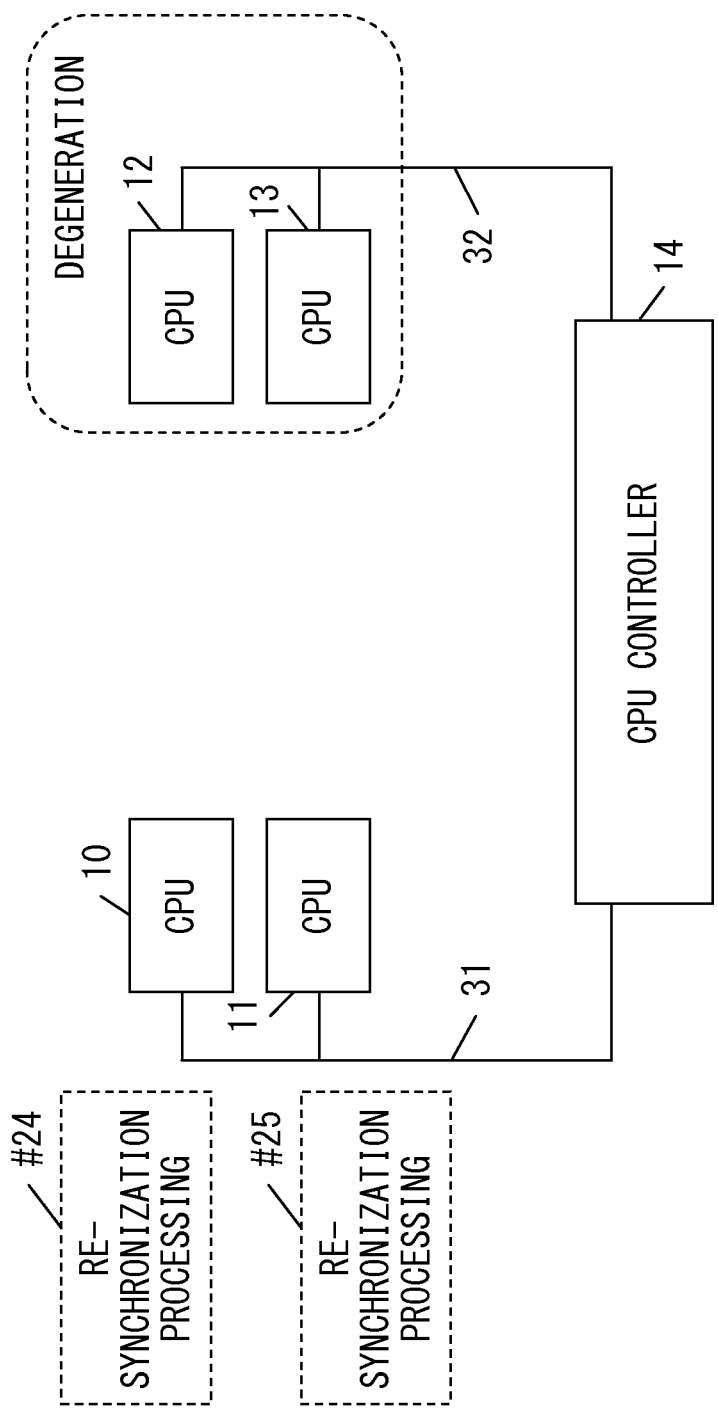
FIG. 21 is a diagram illustrating a detailed example of processing performed when the CPUs performing the synchronization operation simultaneously detect errors.

FIG. 21 illustrates an example of a state in which the CPU 10 returns from the error processing. The CPU 10 returns from the error processing to the normal processing, receives the pending re-synchronization interrupt, and starts the re-synchronization processing (see #24 in FIG. 21). The CPU 11 determines whether all CPUs that perform re-synchronization are ready, i.e., whether the CPU 10 is in a state in which the CPU 10 performs the re-synchronization processing. This processing corresponds to the processing in step S83 in FIG. 10 explained above. In this example, the CPU 10 receives the re-synchronization interrupt. Therefore, the CPU 11 determines that the CPU 10 is in a state in which the CPU 10 performs the re-synchronization processing. As a result, the CPU 11 executes the re-synchronization processing (see #25 in FIG. 21 and S84 in FIG. 11).

Figure 22:
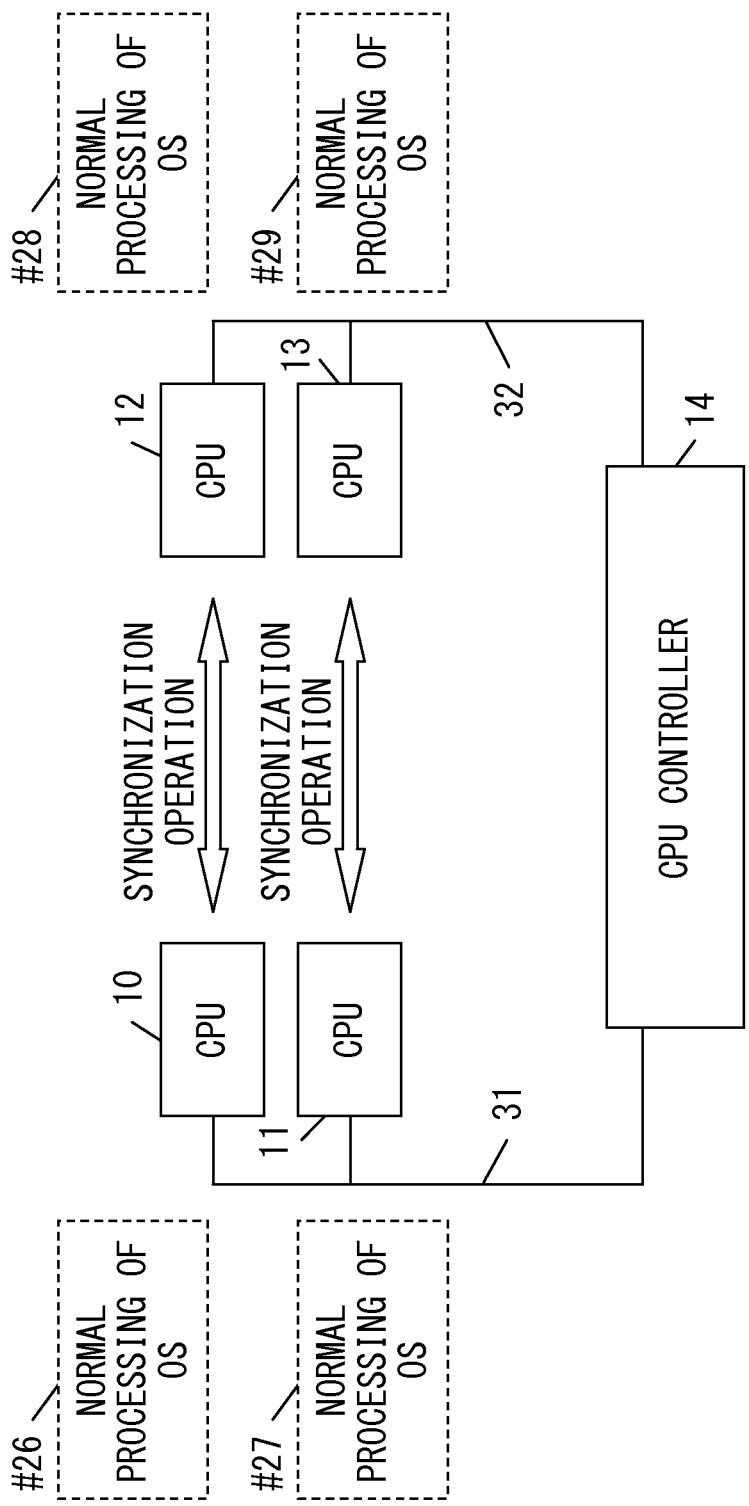
FIG. 22 is a diagram illustrating a detailed example of processing performed when the CPUs performing the synchronization operation simultaneously detect errors.
Figure 23:
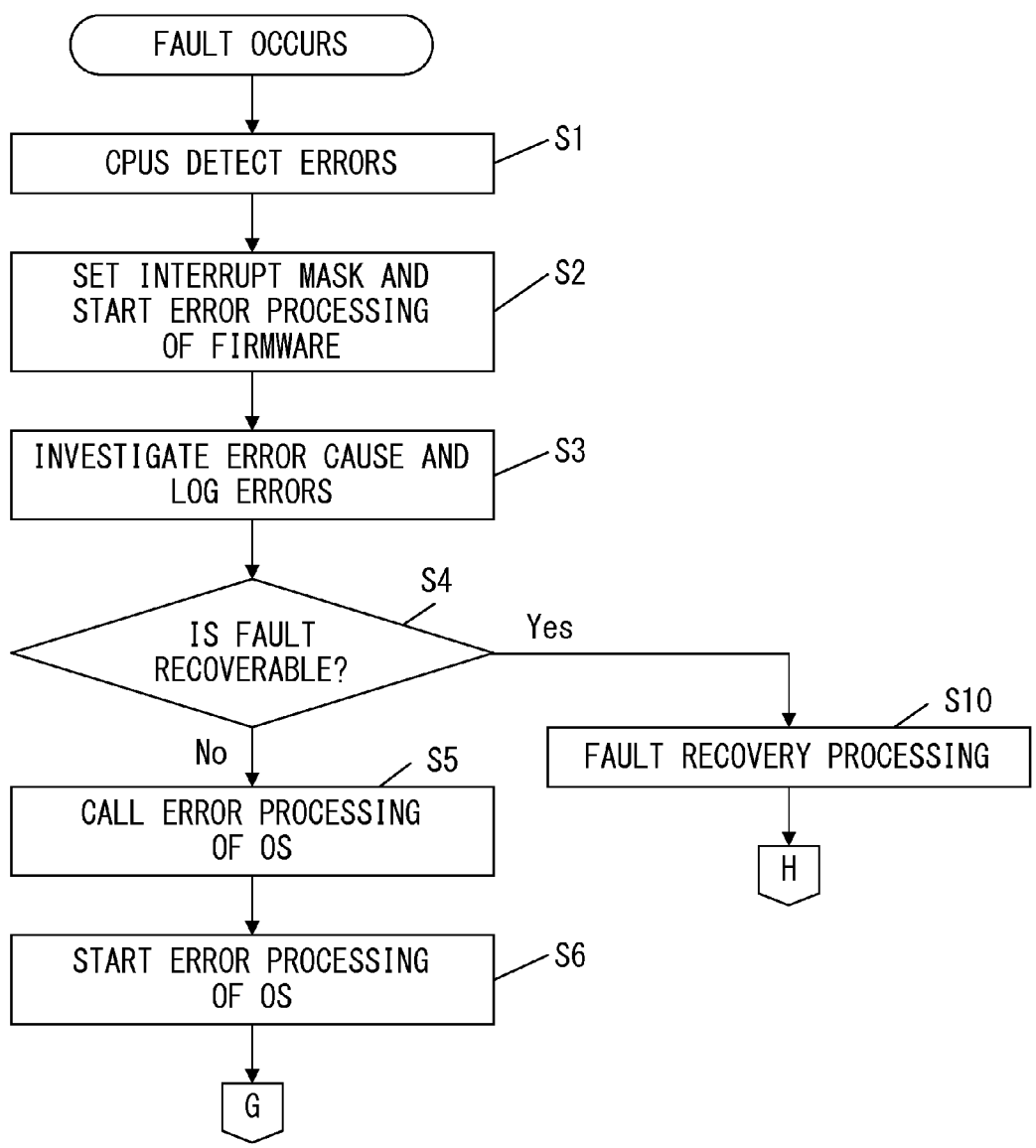
FIG. 23 is an example of a flow of operation processing performed when CPUs detect errors.
Figure 24:
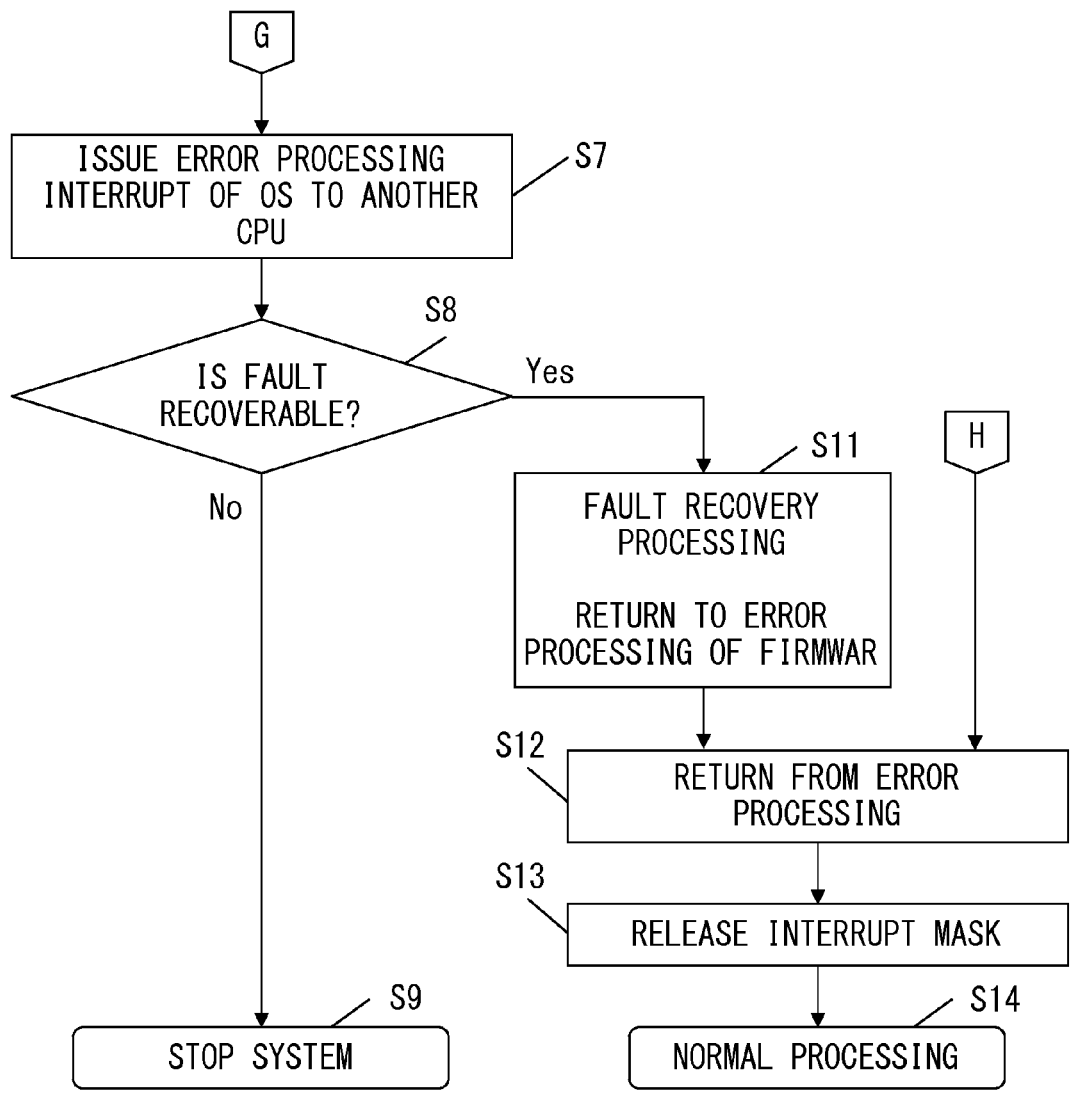
FIG. 24 is the example of the flow of the operation processing performed when the CPUs detect errors.
Figure 25:
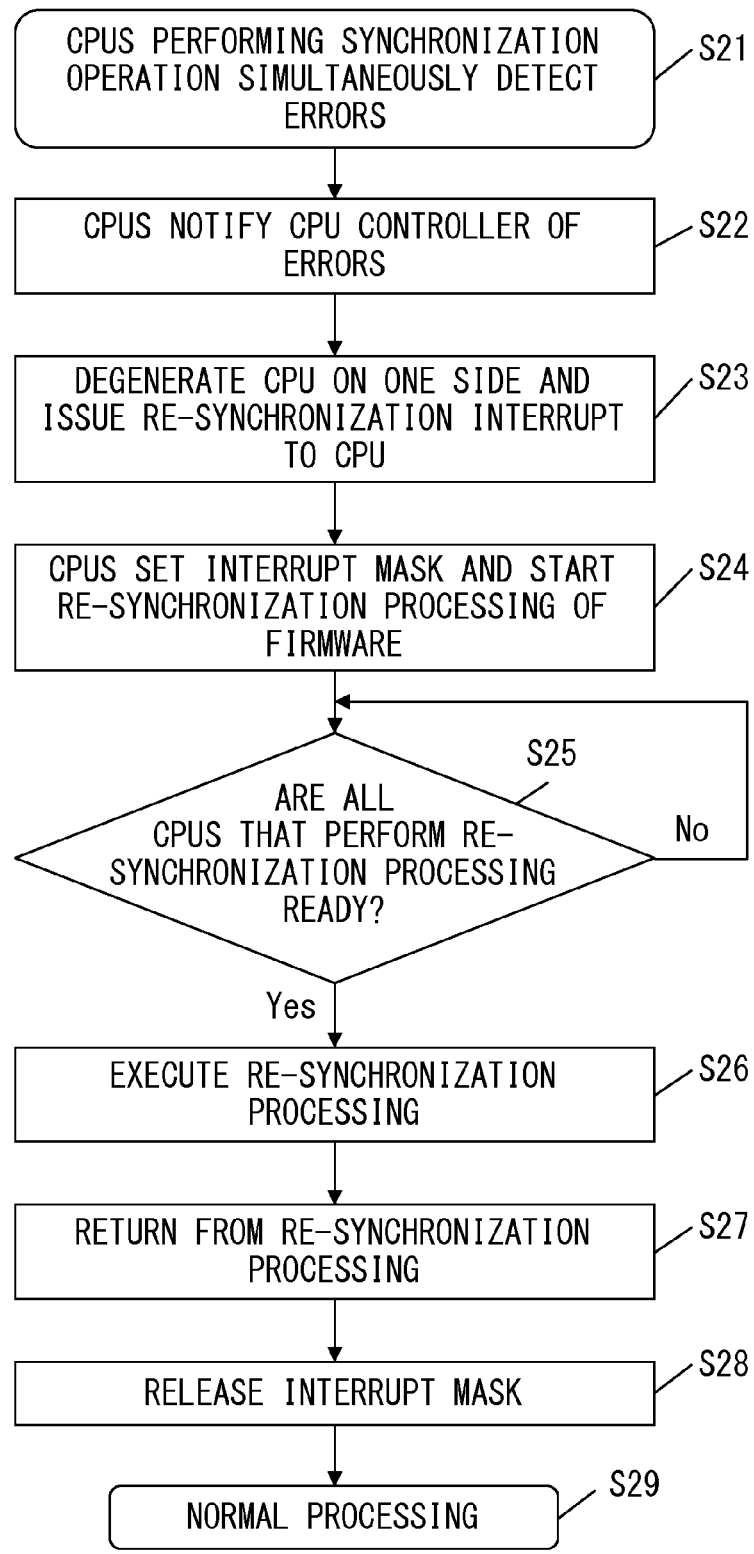
FIG. 25 is an example of a flow of operation processing performed when the CPU controller issues the re-synchronization interrupt.
Figure 27:
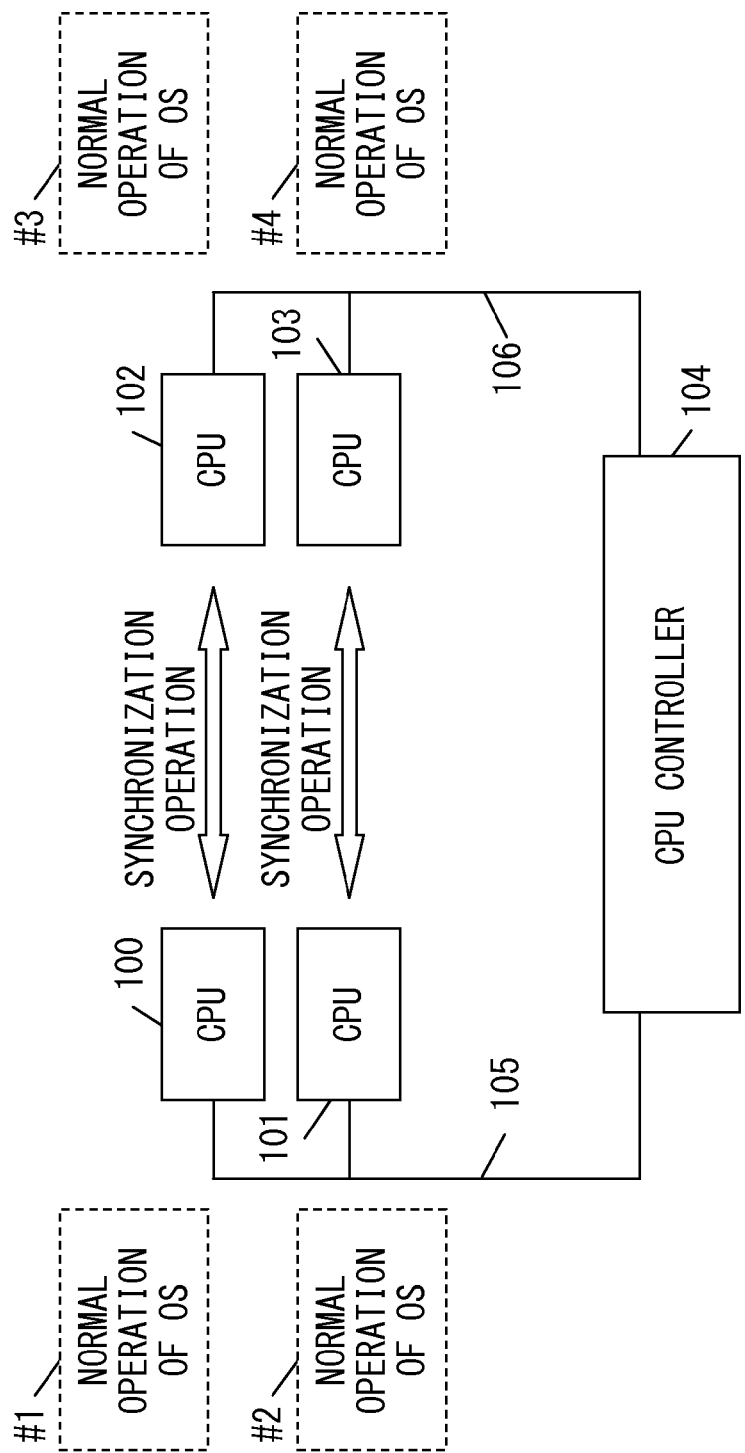
FIG. 27 is a diagram illustrating a detailed example of processing performed when CPUs performing synchronization operation simultaneously detect errors.
Figure 28:
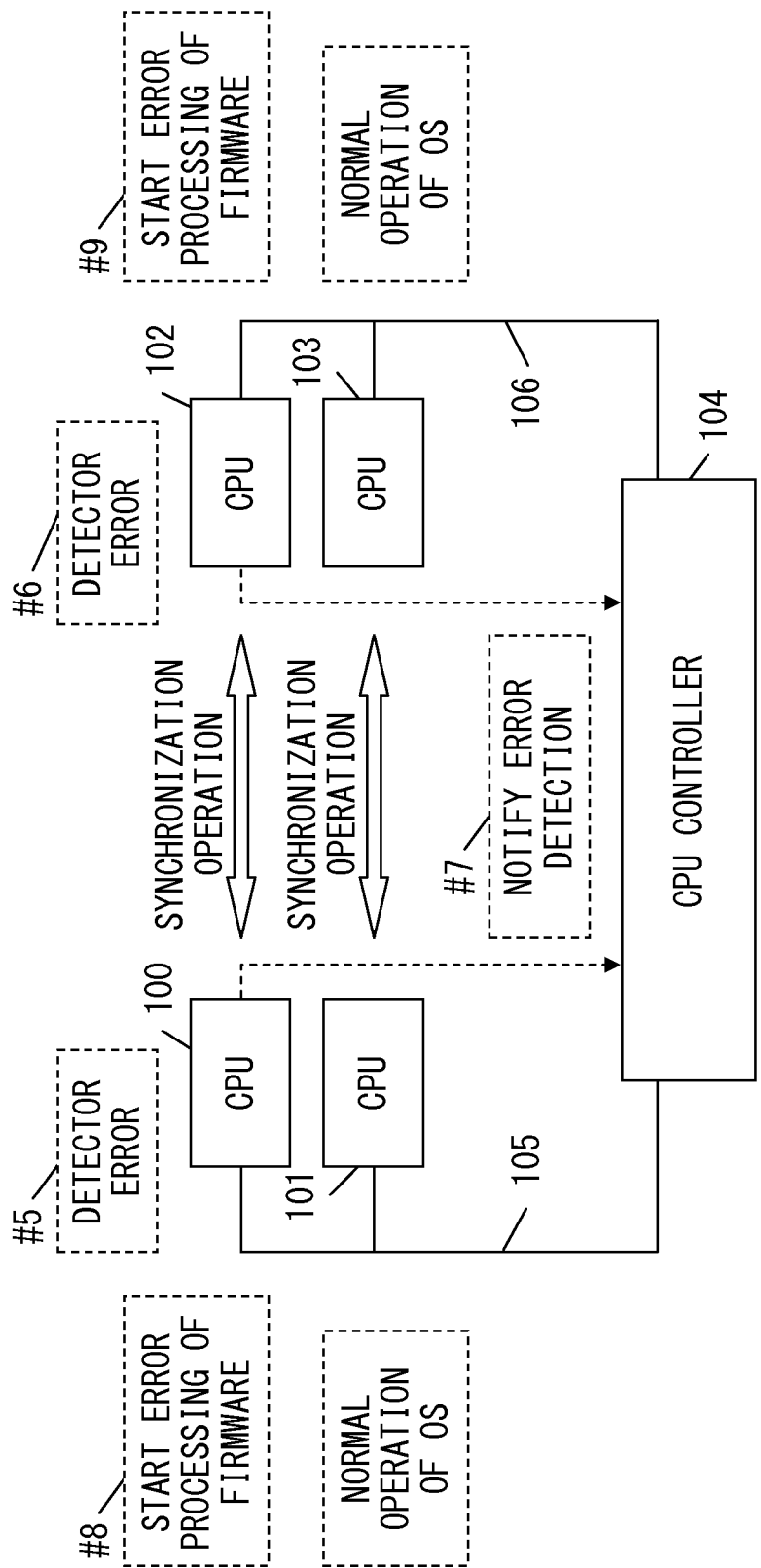
FIG. 28 is a diagram illustrating the detailed example of processing performed when the CPUs performing the synchronization operation simultaneously detect errors.
Figure 29:
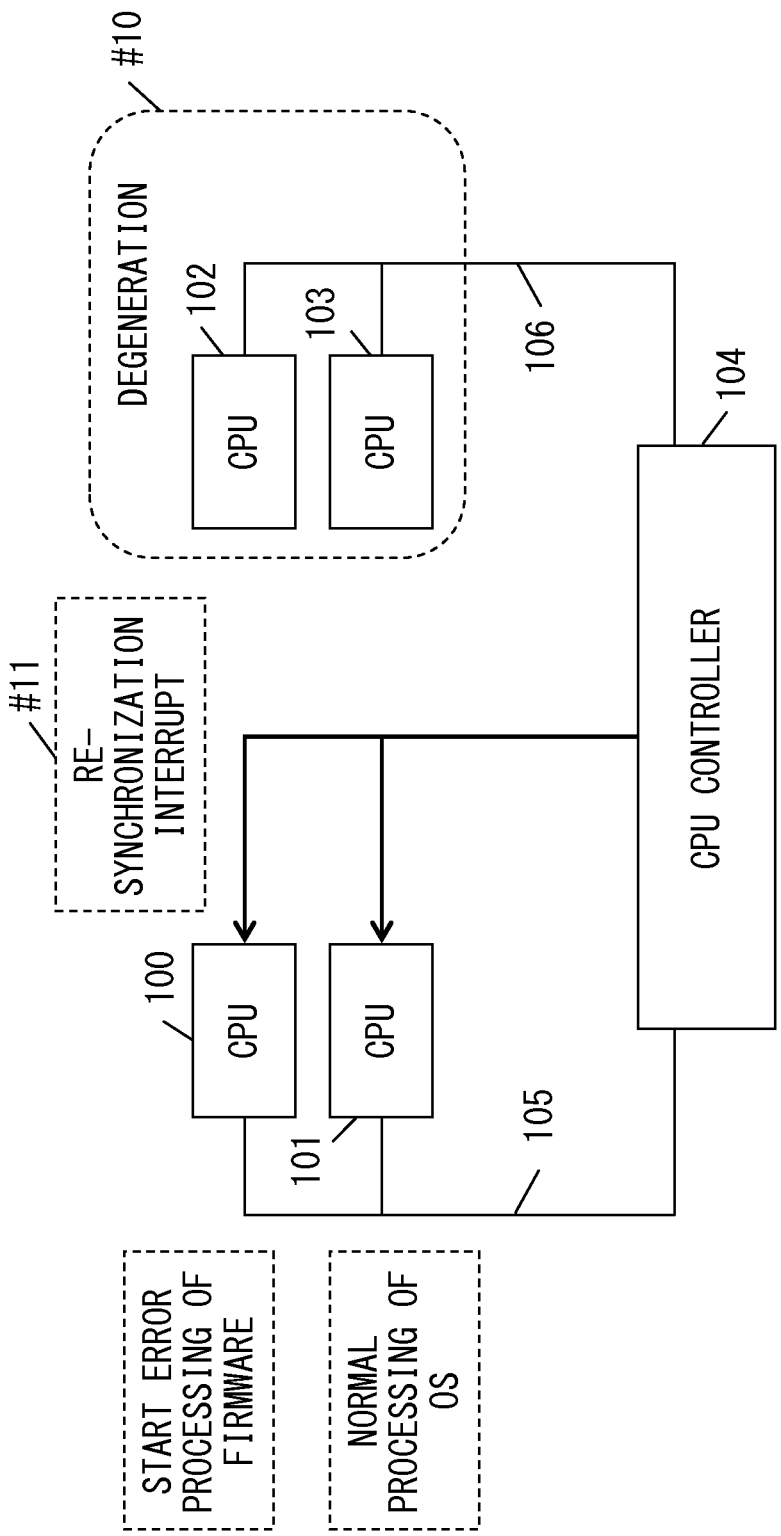
FIG. 29 is a diagram illustrating the detailed example of processing performed when the CPUs performing the synchronization operation simultaneously detect errors.
Figure 30:
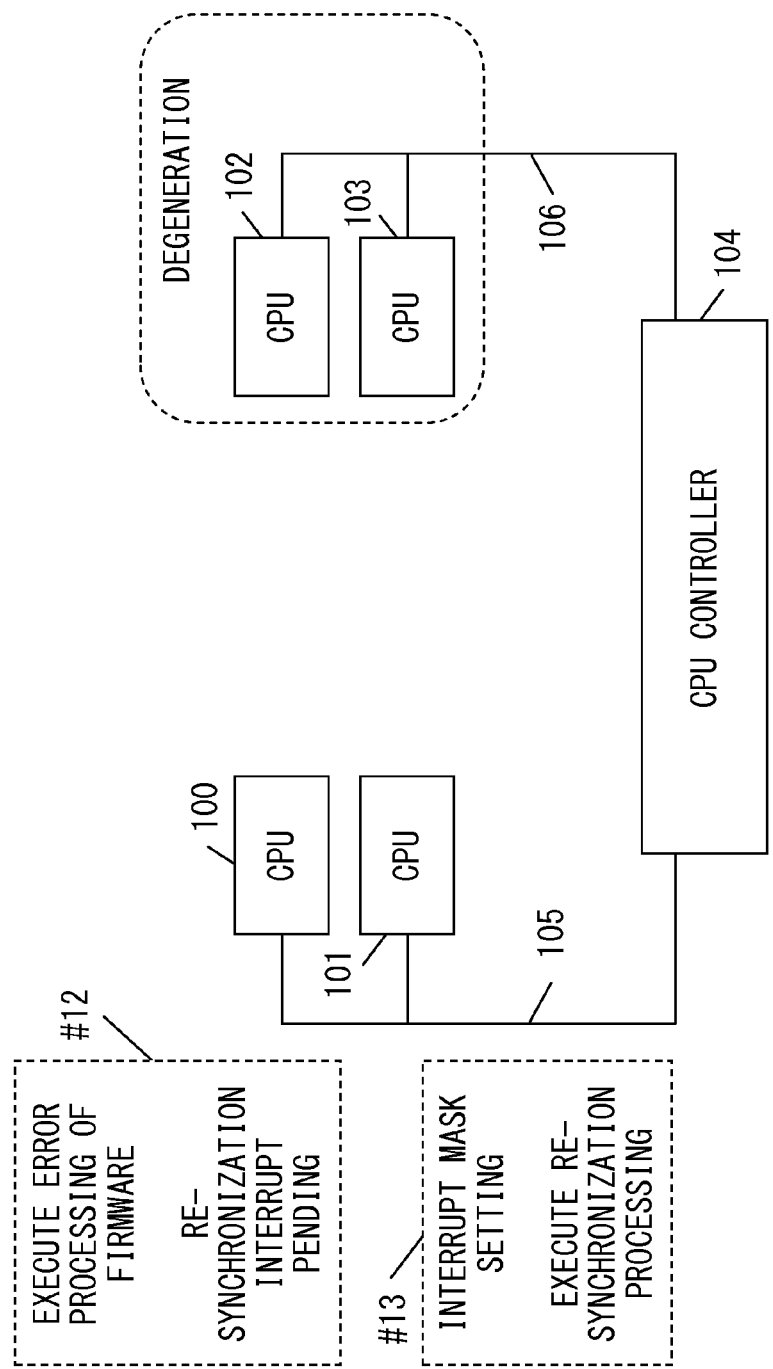
FIG. 30 is a diagram illustrating the detailed example of processing performed when the CPUs performing the synchronization operation simultaneously detect errors.
Figure 31:
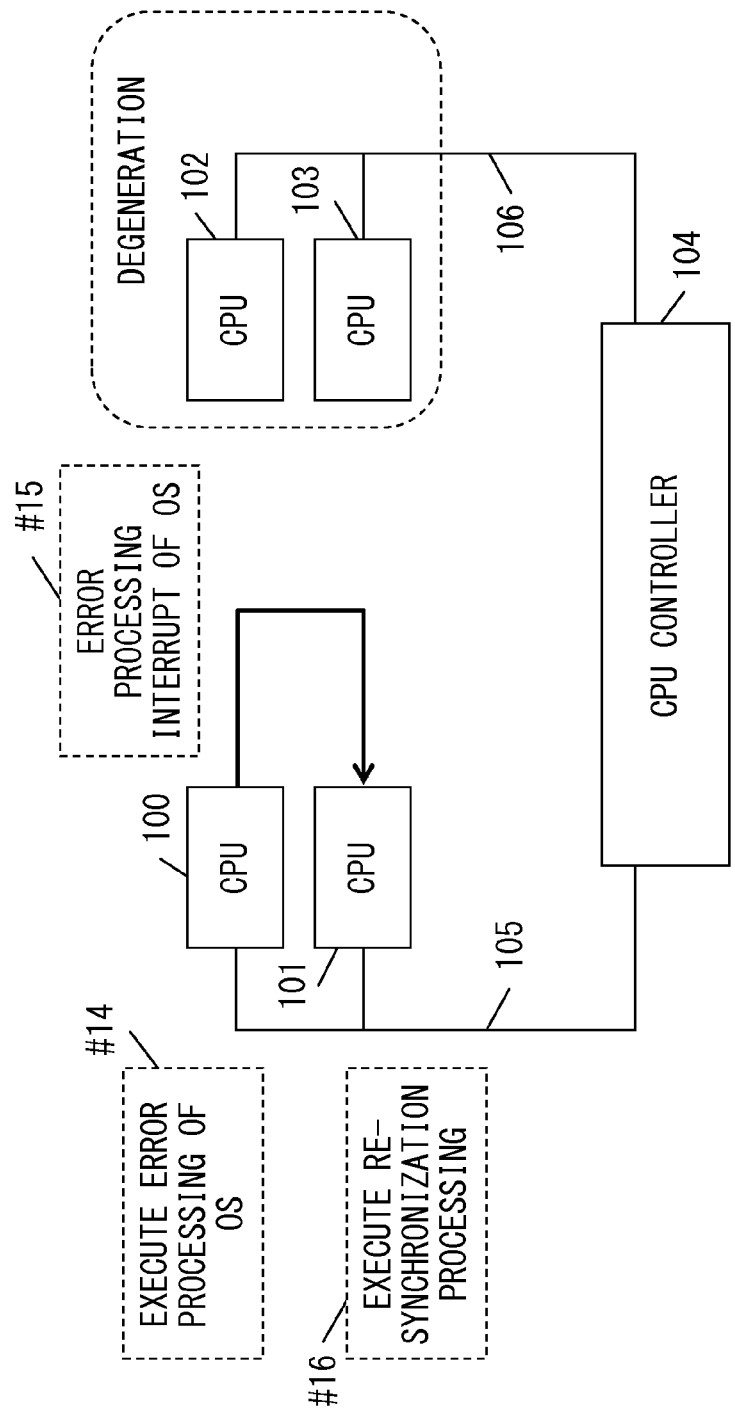
FIG. 31 is a diagram illustrating the detailed example of processing performed when the CPUs performing the synchronization operation simultaneously detect errors.
Figure 32:
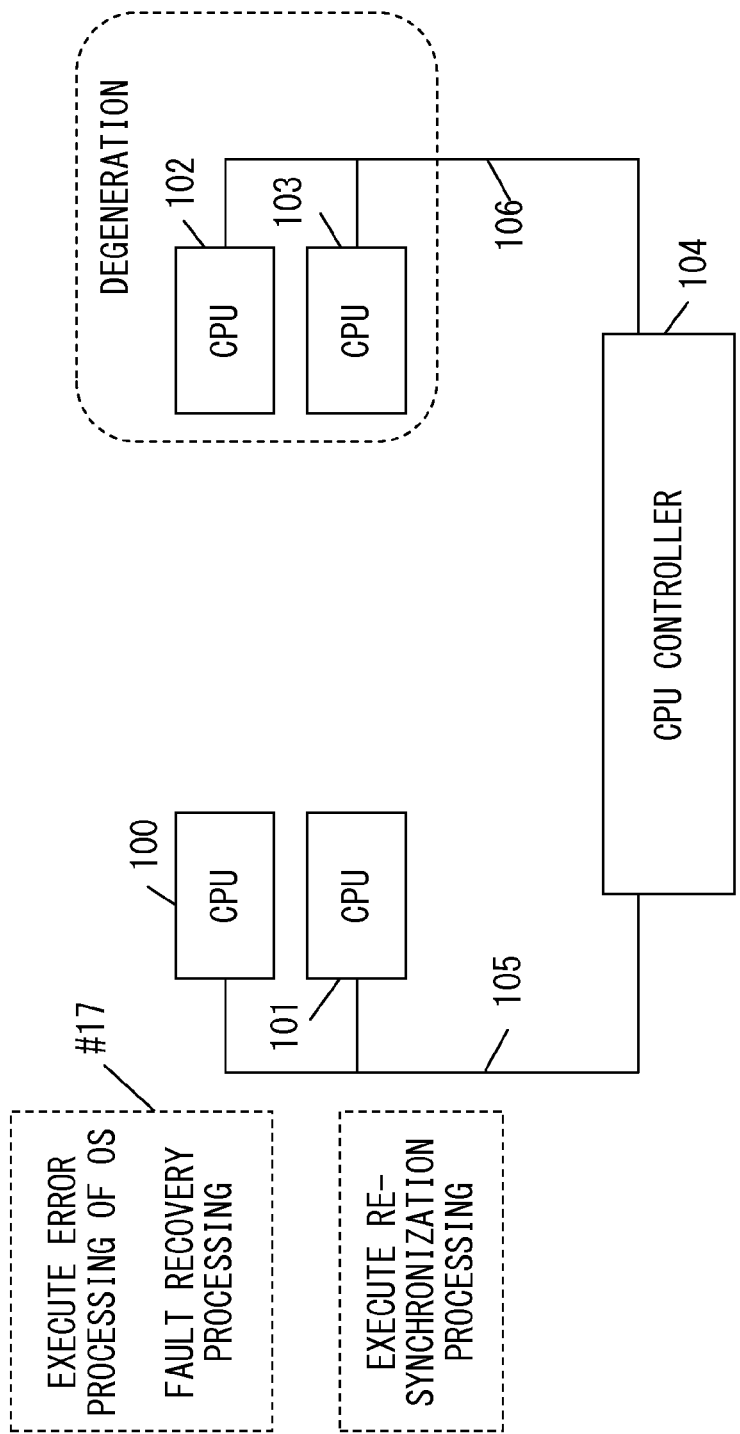
FIG. 32 is a diagram illustrating the detailed example of processing performed when the CPUs performing the synchronization operation simultaneously detect errors.
Figure 33:
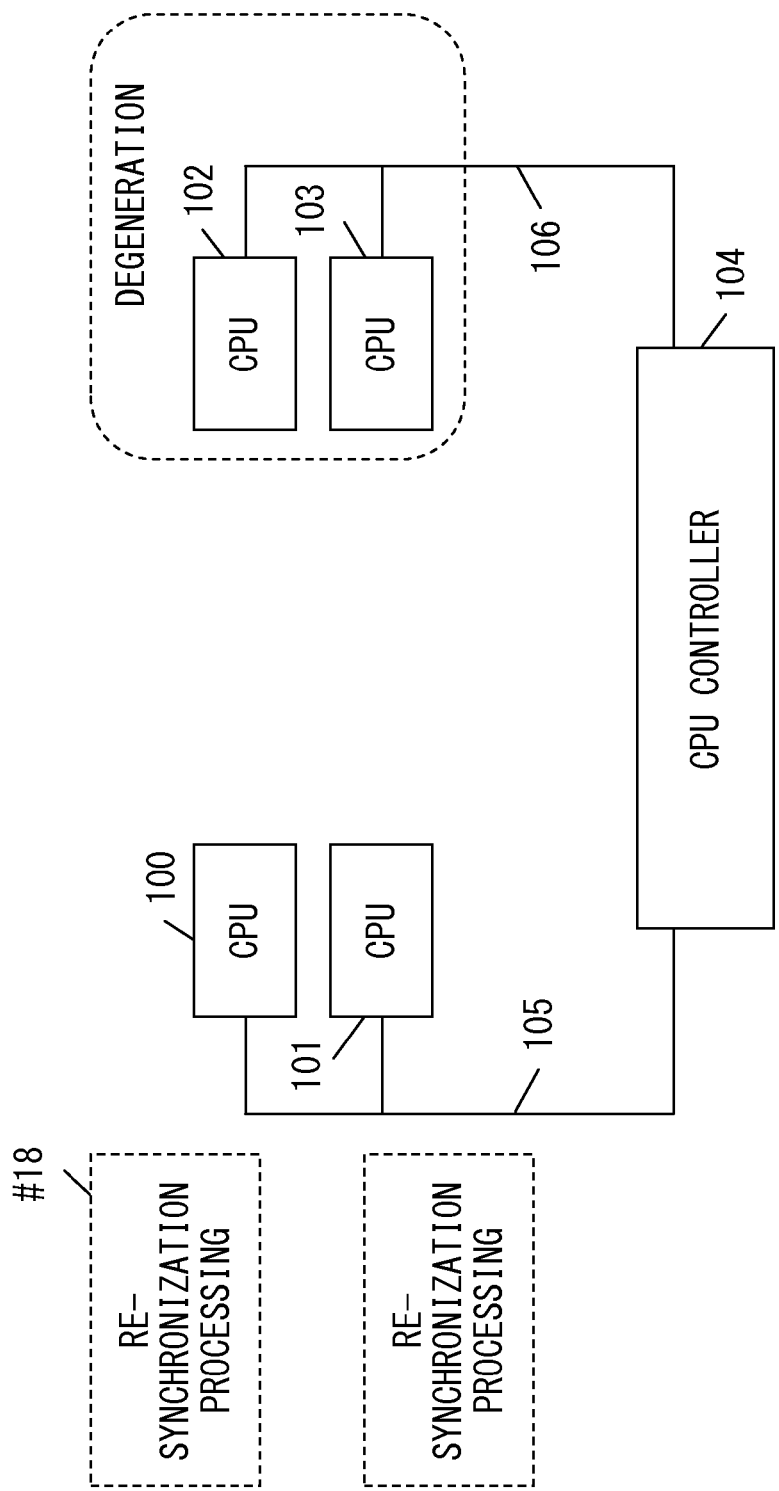
FIG. 33 is a diagram illustrating the detailed example of processing performed when the CPUs performing the synchronization operation simultaneously detect errors.
Figure 34:
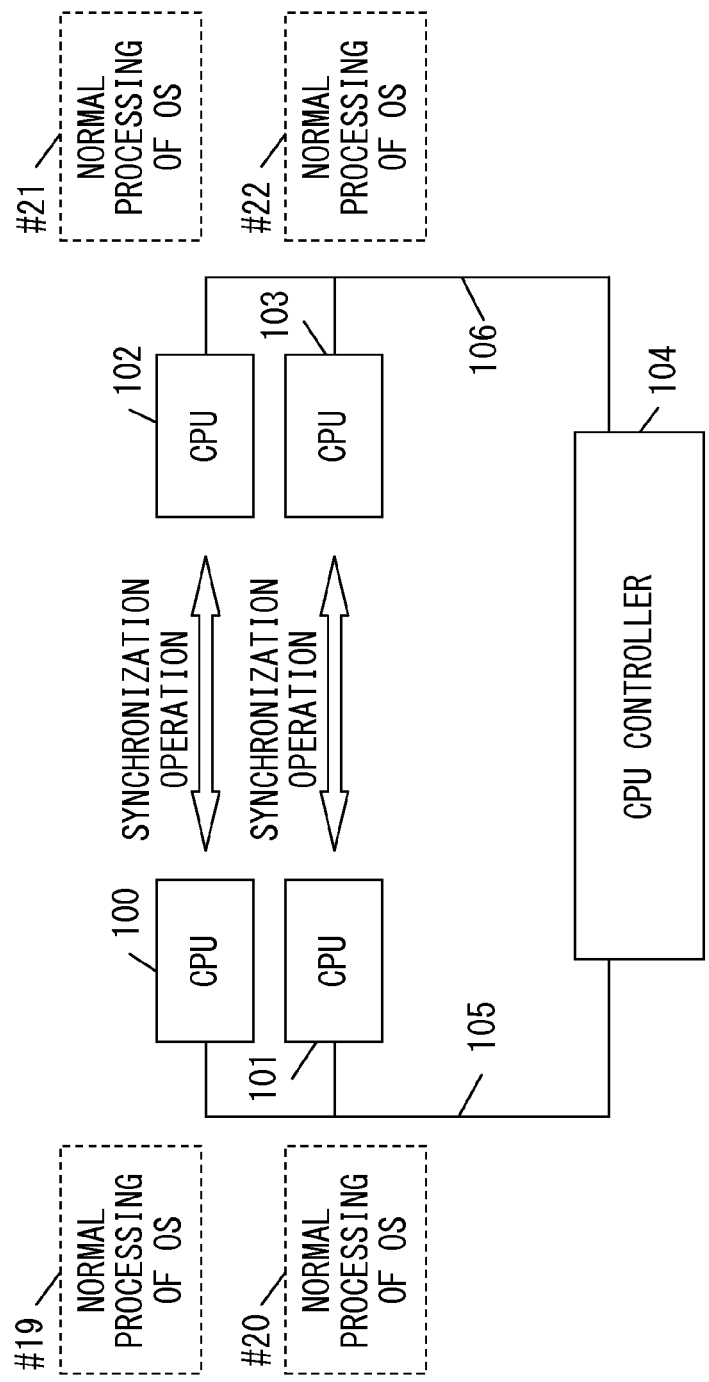
FIG. 34 is a diagram illustrating the detailed example of processing performed when the CPUs performing the synchronization operation simultaneously detect errors.

FIG. 22 illustrates an example of a state after the CPU 10 and the CPU 11 complete the re-synchronization processing. When the CPU 10 and the CPU 11 complete the re-synchronization processing, the CPU 10 and the CPU 11 return to the normal processing of the OS (see #26 and #27 in FIG. 22). The CPU 10 and the CPU 11 respectively operate in synchronization with the CPU 12 and the CPU 13. As a result, the CPU 12 and the CPU 13 execute the normal processing of the OS (see #28 and #29 in FIG. 22).

With the information processing apparatus, the control method for the information processing apparatus, and the control program for the information processing apparatus according to the present embodiment, when control devices performing a synchronization operation simultaneously detect errors, a control device that does not detect an error can execute error processing of an OS.

What is claimed is:

1. An information processing apparatus comprising:
a degeneration control unit that degenerates a second control device group of a first control device group including a first control device and a third control device different from the first control device and the second control device group including a second control device when the first control device and the second control device performing a synchronization operation with each other detect occurrence of errors; and
a re-synchronization processing instructing unit that instructs the first control device and the third control device included in the first control device group to execute re-synchronization processing, wherein
when the third control device included in the first control device group receives the instruction for the execution of the re-synchronization processing, the third control device performs interrupt mask setting, and
when the first control device included in the first control device group receives the instruction for the execution of the re-synchronization processing, the first control device withholds the execution of the re-synchronization processing, starts error processing, and instructs the control device that performs the interrupt mask setting to release the interrupt mask.

2. The information processing apparatus according to claim 1, wherein the first control device issues an error processing interrupt to the control device which the first control device has instructed to release the interrupt mask, and causes the control device to execute the error processing.

3. The information processing apparatus according to claim 2, wherein the first control device issues a re-synchronization interrupt to the control device which the first control device has instructed to execute the error processing when the first control device has completed the execution of the error processing, and causes the control device to execute the re-synchronization processing.

4. The information processing apparatus according to claim 3, wherein the control device receives the issuance of the re-synchronization interrupt from the first control device, determines whether all control devices that execute the re-synchronization processing are ready, and executes the re-synchronization processing when the control device receives the issuance of the re-synchronization interrupt and determines that all control devices that execute the re-synchronization processing are ready.

5. A control method for an information processing apparatus, the control method comprising:
degenerating a second control device group of a first control device group including a first control device and a third control device different from the first control device and the second control device group including a second control device when the first control device and the second control device performing a synchronization operation with each other detect occurrence of errors;
instructing the first control device and the third control device included in the first control device group to execute re-synchronization processing, wherein
when the third control device included in the first control device group receives the instruction for the execution of the re-synchronization processing, the third control device performs interrupt mask setting; and
when the first control device included in the first control device group receives the instruction for the execution of the re-synchronization processing, the first control device withholds the execution of the re-synchronization processing, starts error processing, and instructing the control device that performs the interrupt mask setting to release the interrupt mask.

6. The control method for an information processing apparatus according to claim 5, wherein the first control device issues an error processing interrupt to the control device which the first control device has instructed to release the interrupt mask, and causes the control device to execute the error processing.

7. The control method for an information processing apparatus according to claim 6, wherein the first control device completes the execution of the error processing, issues a re-synchronization interrupt to the control device which the first control device has instructed to execute the error processing, and causes the control device to execute the re-synchronization processing.

8. The control method for an information processing apparatus according to claim 7, wherein the control device receives the issuance of the re-synchronization interrupt from the first control device, determines whether all control devices that execute the re-synchronization processing are ready, and executes the re-synchronization processing when the control device receives the issuance of the re-synchronization interrupt and determines that all control devices that execute the re-synchronization processing are ready.

9. A non-transitory computer-readable medium for storing control program for directing an information processing apparatus to perform a process, the process comprising:
degenerating a second control device group of a first control device group including a first control device and a third control device different from the first control device and the second control device group including a second control device when the first control device and the second control device performing a synchronization operation with each other detect occurrence of errors;

instructing the first control device and the third control device included in the first control device group to execute re-synchronization processing, wherein when the third control device included in the first control device group receives the instruction for the execution of the re-synchronization processing, the third control device performs interrupt mask setting; and when the first control device included in the first control device group receives the instruction for the execution of the re-synchronization processing, the first control device withholds the execution of the re-synchronization processing, starts error processing, and instructing the control device that performs the interrupt mask setting to release the interrupt mask.

10. The non-transitory computer-readable medium according to claim 9, wherein the first control device issues an error processing interrupt to the control device which the first control device has instructed to release the interrupt mask, and causes the control device to execute the error processing.

11. The non-transitory computer-readable medium according to claim 9, wherein the first control device completes the execution of the error processing, issues a re-synchronization interrupt to the control device which the first control device has instructed to execute the error processing, and causes the control device to execute the re-synchronization processing.

12. The non-transitory computer-readable medium according to claim 9, wherein the control device receives the issuance of the re-synchronization interrupt from the first control device, determines whether all control devices that execute the re-synchronization processing are ready, and executes the re-synchronization processing when the control device receives the issuance of the re-synchronization interrupt and determines that all control devices that execute the re-synchronization processing are ready.

* * * * *